United States Patent [19]
Kishi

[11] Patent Number: 5,575,082
[45] Date of Patent: Nov. 19, 1996

[54] RAW SEWAGE DISPOSAL APPARATUS

[75] Inventor: Mitsuhiro Kishi, Ashikaga, Japan

[73] Assignee: Nikken Corporation, Tokyo, Japan

[21] Appl. No.: 230,537

[22] Filed: Apr. 20, 1994

[30] Foreign Application Priority Data

Apr. 26, 1993 [JP] Japan .................................. 5-121968
Apr. 28, 1993 [JP] Japan .................................. 5-125360

[51] Int. Cl.$^6$ .................................................. F26B 3/34
[52] U.S. Cl. ............................... 34/247; 34/255; 34/95; 110/216; 4/111.1
[58] Field of Search ....................... 34/60, 95, 247, 34/255; 110/216; 4/111.1

[56] References Cited

U.S. PATENT DOCUMENTS

| | | | |
|---|---|---|---|
| 4,546,502 | 10/1985 | Lew | 4/111.1 |
| 4,999,930 | 3/1991 | Kishi et al. | 34/95 |
| 5,058,213 | 10/1991 | Kishi et al. | 4/111.1 |
| 5,152,074 | 10/1992 | Kishi | 34/247 |
| 5,230,164 | 7/1993 | Kishi | 34/60 |
| 5,257,466 | 11/1993 | Kishi | 34/95 |
| 5,261,126 | 11/1993 | Kishi | 4/111.5 |

OTHER PUBLICATIONS 13 sheets of drawings containing Figures 1–13 from copending U.S. Ser. No. 08/143 522, filed Oct. 26, 1993.

Primary Examiner—John M. Sollecito
Assistant Examiner—Steve Gravini
Attorney, Agent, or Firm—Flynn, Thiel, Boutell & Tanis, P.C.

[57] ABSTRACT

A disposal apparatus according to a first aspect comprises an evaporation pipe communicating with a container for discharging vapor evaporated from raw sewage therein. A catalyst box accommodates a catalyst and communicates with the evaporation pipe. An ejector connects to the catalyst box for drawing air therefrom. A hot-air blower connects upstream to the catalyst box for heating flowing air, and an air supply unit supplies air to the ejector and the hot-air blower. A bypass pipe communicates between the ejector and the container. The disposal apparatus according to a second aspect comprises a heat-resistant airtight container for raw sewage, and an induction heating device disposed under the container. The heating device has a coil for generating a high-frequency electromagnetic wave to heat the container by induction. A rotatable stirrer and heat-holding balls are contained in the container. A stool communicates with the container through a valve mechanism.

7 Claims, 24 Drawing Sheets

FIG. 6

| | STANDBY WHILE PREHEATING | INTRODUCING OF RAW SEWAGE | DURING DRY PROCESSING | CLEANING OF DRYING CAULDRON |
|---|---|---|---|---|
| MOTOR 35 (AIR BLOWER 14) | ON (40Hz) | ON (60Hz) | ON (40Hz) | ON (60Hz) |
| STIRRING MOTOR 23 | ON | ON | ON | ON |
| CATALYST HEATER 57 | ON | ON | ON | OFF |
| HEATER 44 | OFF | OFF | ON | OFF |
| SELECTOR VALVE 32 | A SIDE | A SIDE | A SIDE | B SIDE |
| SELECTOVE VALVE 38 | C SIDE | C SIDE | C SIDE | D SIDE |
| SELECTOR VALVE 48 | E SIDE | E SIDE | E SIDE | F SIDE |
| VALVE MECHANISM 12 | CLOSE | OPEN | CLOSE | CLOSE |
| CLOSING VALVE 40 | CLOSE | CLOSE | CLOSE | OPEN |
| CLOSING VALVE 42 | CLOSE | CLOSE | OPEN | CLOSE |

FIG. 19

| | PRE-HEATING | STANDBY | INTRODU-CING OF RAW SEWAGE | DURING DRY PROCESSING | CLEANING OF DRY CAULDRON |
|---|---|---|---|---|---|
| MOTOR 135 (AIR BLOWER 114) | ON (45Hz) | ON (30Hz) | ON (60Hz) | ON (45Hz) | ON (60Hz) |
| STIRRING MOTOR 123 | ON (50Hz) | ON (60Hz) | ON (50Hz) | ON (50Hz) | ON (120Hz) |
| CATALYST HEATER 157 | ON | ON | OFF | ON | OFF |
| HIGH-FREQUENCY COIL 169 | OFF | OFF | ON | ON | OFF |
| SELECTOR VALVE 132 | A SIDE | A SIDE | A SIDE | A SIDE | B SIDE |
| SELECTOR VALVE 138 | C SIDE | C SIDE | C SIDE | C SIDE | D SIDE |
| SELECTOR VALVE 148 | E SIDE | E SIDE | E SIDE | E SIDE | F SIDE |
| VALVE MECHANISM 112 | CLOSE | CLOSE | OPEN | CLOSE | CLOSE |
| CLOSING VALVE 140 | CLOSE | CLOSE | CLOSE | CLOSE | OPEN |
| CLOSING VALVE 142 | CLOSE | OPEN | CLOSE | OPEN | CLOSE |
| CLOSING VALVE 157 | CLOSE | CLOSE | CLOSE | CLOSE | OPEN |
| CLOSING VALVE 159 | OPEN | OPEN | CLOSE | OPEN | CLOSE |
| CLOSING VALVE 162 | OPEN | OPEN | CLOSE | OPEN | CLOSE |

RAW SEWAGE DISPOSAL APPARATUS

FIELD OF THE INVENTION

The present invention relates to a raw sewage disposal apparatus, and more particularly to such an apparatus capable of preventing a hot-air means as disposed in a front stage of a catalyst box from being corrupted, broken, etc., so as to be capable of use for a long period of time.

BACKGROUND OF THE INVENTION

The raw sewage discharged from humans is typically discharged into a sewage system by a flush toilet or the like and then flows into a river after purification in a holding tank. However, at events such as festivals, athletic events, fairs, meetings and the like, temporary toilet facilities must be provided for disposal of raw human waste.

Employed conventionally are movable temporary toilets, most of which have a tank for temporarily storing the raw sewage therein. However, temporary toilets require the raw sewage contained in the tank be sucked into a vacuum truck, and the collected raw sewage must then be transferred to a sewage purifying facility. This is laborious and time consuming and is unhygienic.

Transportation vehicles such as trains and buses, which operate over long distance, are provided with a tank exclusively for storing the discharged raw sewage. The raw sewage in this tank is subjected to a chemical deodorizing treatment and is thereafter collected by a vacuum truck at a terminal or collection point.

The storing, collecting and disposal methods are thus not modern and are very unhygienic. If the temporary toilet has been used for a long period of time, the raw sewage in the tank causes a bad smell, and operators dislike disposing of the raw sewage.

In an attempt to ameliorate the above problems, there have been proposed several hygienic disposal methods. In one method, chemicals are introduced into the raw sewage storage tank to prevent the generation of the bad smell and to effect sterilization of the sewage. This method, however, cannot be used for a long period of time because the chemicals become diluted, and costs are high, though this method is often employed in transportation vehicles.

In another method, the raw sewage is contained in a bag made of vinyl or the like to prevent the diffusion of the bad smell. This method, however, requires a vinyl bag of large size and involves a high cost for disposal thereof, and it is troublesome to separate the raw sewage from the bag. A large-scale disposal facility is also required.

In still another method, the discharged raw sewage is directly dried by use of heat from a burner, etc. Since the primary component of raw sewage is liquid, a large amount of heat energy is required to remove the liquid and it takes a long period of time to effect disposal of the raw sewage.

In view of the drawbacks of the above conventional methods, the inventor proposed a disposing apparatus having a casing provided with stirring blades and heat-holding balls therein, in which the raw sewage is stirred by rotation of the stirring blades and heated by heat generated by the heat-holding balls, whereby the raw sewage is dried in a short period of time and the liquid is evaporated. This apparatus is disclosed in Japanese Patent Nos. 63-124150, 2-411577, and U.S. Pat. Nos. 4,999,930, 5,058,213, 5,152, 074, 5,230,164, 5,257,466, and U.S. patent application Ser. No. 07/809,962 filed Dec. 18, 1991 abandoned, continuation application filed on Oct. 26, 1993, as Ser. No. 08/143,522 now U.S. Pat. No. 5,418,982 and Ser. No. 07/985,556 filed Dec. 3, 1992, now U.S. Pat. No. 5,261,126.

According to the above proposed disposal methods, the raw sewage is heated, evaporated in the casing and diffused into the ambient atmosphere. Before the liquid component is diffused, the components which cause bad smell are resolved by a catalyst so that the liquid water is diffused into the atmosphere as an odorless vapor. It was preferable to employ such a method in view of environmental hygiene and preservation, even if such method is employed in crowded buildings and/or by crowds of people.

It is very hygienic to evaporate and diffuse the raw sewage contained in the airtight tank and such operation can be carried out systematically, which results in not causing a burden to the operators. In the above-described raw sewage disposal apparatus as proposed by the inventor, raw sewage is contained in an airtight container (drying cauldron) and the lower portion of the airtight container is heated by a heater, etc. Thus evaporated vapor, etc. in the container are introduced into a dust collection box for removing dust from the evaporated vapor, etc., then introduced into a catalyst box, and then diffused in the atmosphere. The reason why the vapor evaporated in the airtight container is caused to contact the catalyst is that the bad smell component is changed into an odorless component, thereby preventing the bad smell from being diffused in the ambient atmosphere.

In this case, platinum is used as a catalyst to subject the bad smell component to oxidation-reduction. Accordingly, the catalyst must be maintained at a constant temperature. A catalyst heater is conventionally accommodated in the lower portion of the catalyst box. This catalyst heater contacts the evaporated vapor, which causes the catalyst heater to oxidize and causes trouble, for example, corrosion or breakage since ammonia, urea, etc., contained in the raw sewage contacts the catalyst heater. Accordingly, such catalyst heater cannot be used for a long period of time and is troublesome because of the maintenance and replacement thereof.

In order to heat the container containing the raw sewage, there is employed a method for supplying power to the container so as to energize a heater, so that the container is heated from the outside thereof, or another method for directly heating the container by combusting liquid fuel by way of a burner, etc. However, the method for heating the container by the heater is inferior in thermal efficiency since the entire heat is not transmitted to the container. On the other hand, in the method for heating the container by combusting liquid fuel, there is an advantage in that the structure of the container is simple but there are disadvantages in that a containing box surrounding the container and the burner is increased high in temperature, which can cause a fire and the heated container must be cooled, which makes the apparatus large. Furthermore, the method for heating the container by combusting liquid fuel can be employed in the outdoors, but it was dangerous in an indoor location since carbon dioxide is generated. In this prior art raw sewage disposal apparatus, stirring blades are rotated in the container so as to keep the heat uniform, which vibrates the container. If this vibration is transmitted to the heater, the heater may be broken, which takes time and labor for the maintenance thereof. Under the circumstances, there is desired a method for heating the container with high thermal efficiency and without generating carbon dioxide. There is also desired a method for heating the container without using materials which cannot stand much vibration of the heater, etc. under clean conditions at all times.

SUMMARY OF THE INVENTION

To overcome the above disadvantages, it is an object of the invention to provide a raw sewage disposal apparatus according to a first aspect of the invention comprising a heat-resistant airtight container for containing raw sewage therein, heating means for heating and drying the raw sewage in the container, stirring means disposed in the container, the stirring means having a plurality of stirring blades for stirring the raw sewage, a multitude of heat-holding balls contained in the container, a stool to which the raw sewage is discharged, a valve mechanism disposed between the stool and the container for permitting the stool to communicate with the container, an evaporation pipe communicating with the container for discharging vapor evaporated from the raw sewage, a catalyst box accommodating therein a catalyst and communicating with the evaporation pipe, an ejector connected to the downstream side of the catalyst box for drawing air into the catalyst box, a hot-air blower connected to the upstream side of the catalyst box for heating flowing air, an air supply means for supplying air to the ejector and the hot-air blower, and a bypass pipe disposed between the downstream side of the ejector and the container for communicating with the ejector and the container.

It is an object of the invention to provide a raw sewage disposal apparatus according to a second aspect of the invention comprising a heat-resistant airtight container for containing raw sewage therein, induction heating means disposed under the container and being close to the container, the heating means having therein a high-frequency coil for generating a high-frequency electromagnetic wave, wherein the container is heated by induction heating owing to the electromagnetic wave generated by the induction heating means, a high-frequency generating circuit for supplying high-frequency power to the induction heating means, stirring means disposed in the container, the stirring means having a plurality of stirring blades for stirring the raw sewage, a multitude of heat-holding balls contained in the container, a stool to which the raw sewage is discharged, and a valve mechanism disposed between the stool and the container for permitting the stool to communicate with the container.

According to the first aspect of the invention, the raw sewage discharged to the stool is dropped in the drying cauldron by way of the valve mechanism. The liquid component, being the primary component of the raw sewage, is changed into vapor and evaporated when the drying cauldron is heated by the heater. The evaporated vapor is transferred to the catalyst box through the evaporation pipe. Since the hot-air blower is provided upstream relative to the catalyst box and has a catalyst heater therein for warming fresh air, and the fresh air supplied from the air blower passes through the hot-air blower, the catalyst in the catalyst box is always warmed by the hot-air blower. Since the ejector is connected to the catalyst box downstream relative to the catalyst box, the catalyst box is always negatively pressurized. Accordingly, the vapor evaporated from the raw sewage in the drying cauldron enters the catalyst box through the evaporation pipe and is mixed with hot air from the hot-air blower and contacts the catalyst, whereby the bad smell is subjected to the oxidation-reduction and it is odorless and is diffused in the atmosphere. The discharging side of the ejector and the drying cauldron are connected to each other by the bypass pipe so as to supply the fresh air to the drying cauldron, thereby facilitating the oxidation of the raw sewage and enhancing the flowing of the vapor. In such series of processes or operations, the vapor evaporated in the drying cauldron does not directly contact the catalyst heater in the hot-air blower so that the catalyst heater is prevented from being oxidized by various components which are evaporated from the raw sewage, and hence the catalyst heater can be used for a long period of time.

According to the second aspect of the invention, the high-frequency coil is disposed under the drying cauldron at a position close thereto and the high-frequency power is supplied to the high-frequency coil so that the electromagnetic wave is transmitted to the container, thereby heating the drying cauldron per se by electromagnetic induction heating. The electromagnetic wave does not generate heat at portions other than the metal portion of the drying cauldron, but generates the heat at the metal portion of the drying cauldron close to the high-frequency coil, thereby improving the thermal efficiency. Furthermore, the liquid fuel is not combusted, carbon dioxide is not generated, which permits the drying cauldron to be heated under clean conditions. As a result, the drying cauldron can be used in an indoor location or a tunnel. It is possible to provide a gap between the drying cauldron and the high-frequency coil, and the vibration which is generated when the stirring blades are operated in the drying cauldron is not transmitted to the high-frequency coil since the heating function of the high-frequency coil can be achieved even if such gap exists. Accordingly, troubles such as breakage of the high-frequency coil are reduced.

BRIEF DESCRIPTION OF THE DRAWINGS

FIG. 6 is a truth table showing operations of the components of the apparatus of FIG. 1;

FIG. 19 is a truth table showing operations of components of the apparatus of FIG. 11.

DETAILED DESCRIPTION

First Embodiment (FIGS. 1 to 10)

Figure 1:
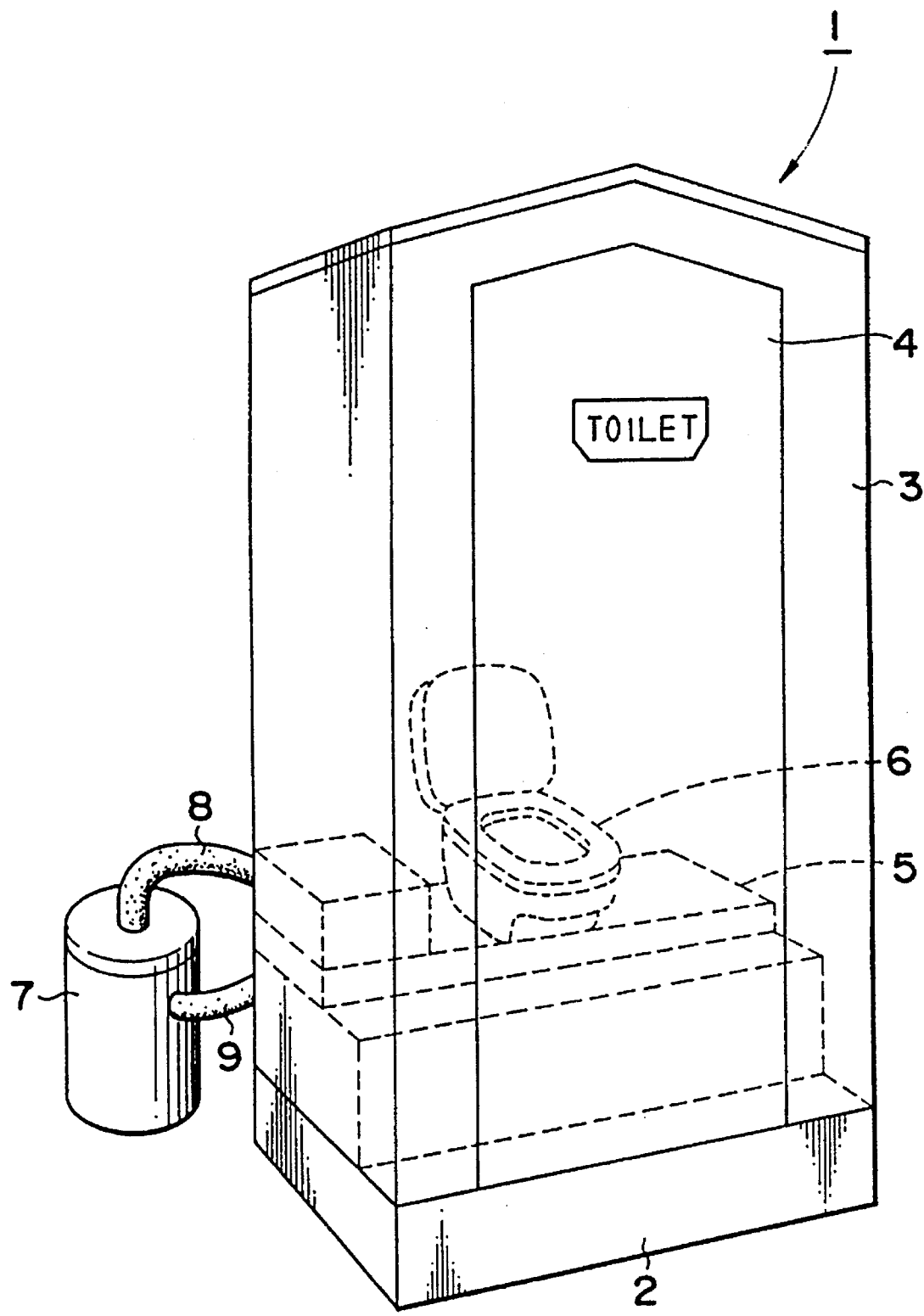
FIG. 1 is a perspective view of a raw sewage disposal apparatus employed in a temporary toilet according to a first embodiment of the invention.

A raw sewage disposal apparatus according to a first embodiment of the invention will be described with reference to FIGS. 1 to 10. Described in the embodiment is a temporary toilet 1 which is freely movable as a unit, and to which the raw sewage apparatus according to the present invention is applied.

The outer frame of the temporary toilet 1 is made of, e.g. plastic or reinforced synthetic resin and has a cubic box-like shape. The temporary toilet 1 has a base 2 which can be supported on the ground at the bottom side thereof. The base 2 has a cubic shape and has a roofed house 3 fixed at the upper portion thereof. A door 4 is attached to the front of the house 3 and opens forward thereof.

The temporary toilet 1 contains a raw sewage disposal apparatus 5 which is fixed to an upper portion of the base 2. A western-style stool 6 is fixed to an upper portion of the disposal apparatus 5. A dust collector 7 having a hollow box-like shape is disposed adjacent the back of the house 3 but is independent of the house 3. The disposal apparatus 5 and the dust collector 7 communicate with each other by a suction hose 8 and a discharge hose 9.

Figure 2:
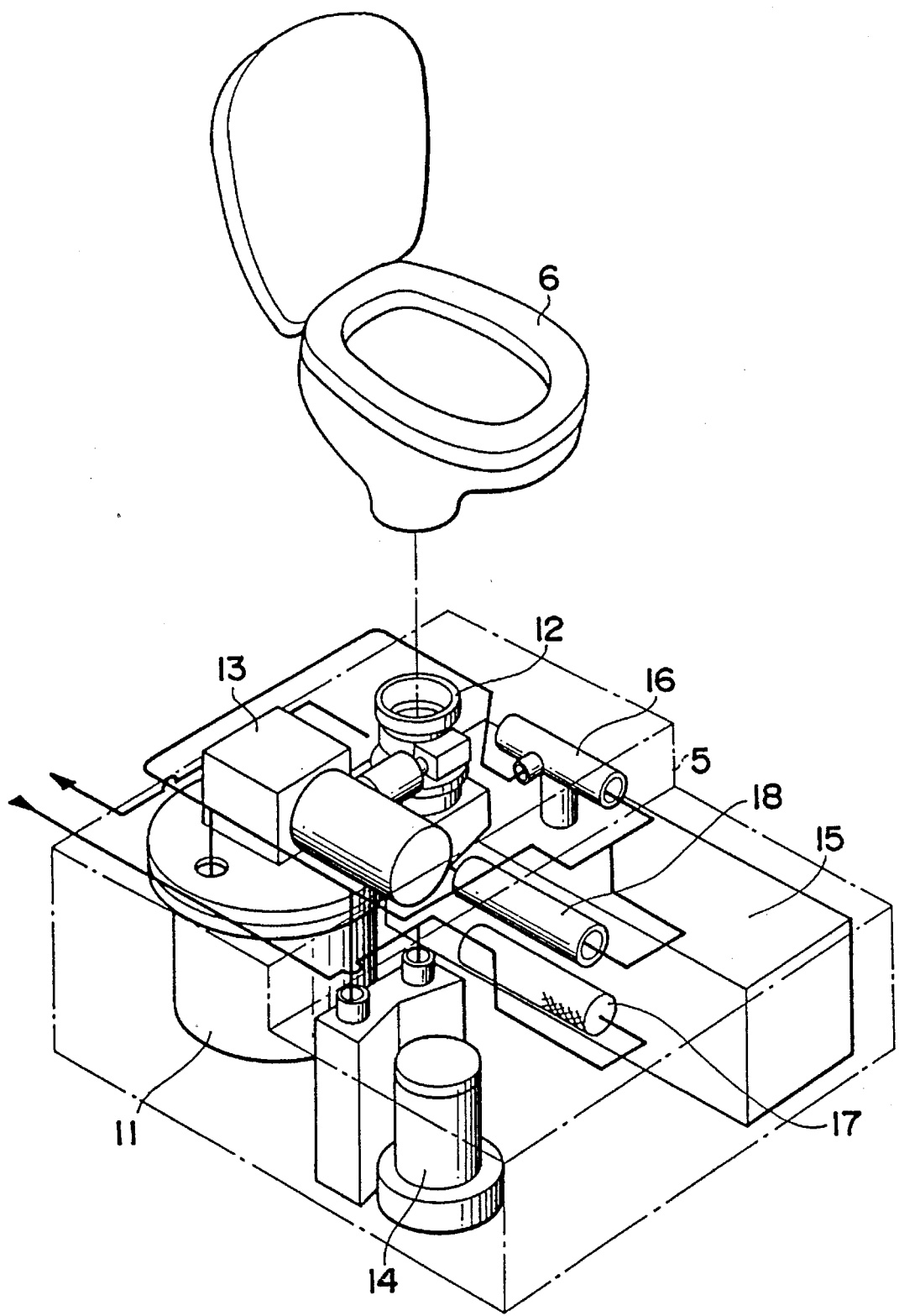
FIG. 2 is a schematic perspective view showing the internal structure of the apparatus of FIG. 1.

FIG. 2 shows the structure of the inside of the apparatus 5, with the main members of the disposal apparatus 5 being shown by solid lines and piping connecting each member being shown by bold lines, but with flow routes being omitted. The disposal apparatus 5 is assembled as a unit which is capable of operating by itself and generally comprises a drying mechanism and a catalyst oxidation-reduction mechanism, etc.

A cylindrical drying cauldron 11 is fixed to the left innermost portion of the disposal apparatus 5, and an air blower 14 is fixed to the disposal apparatus 5 at the front of the drying cauldron 11 for drawing fresh air from the atmosphere so as to perform air circulation in the apparatus 5. A rectangular deodorizing box 15 is covered by a heat insulating member at the outer peripheral portion thereof and is fixed to the right side of the disposal apparatus 5, which box 15 contains a catalyst mechanism therein. A T-shaped ejector 16 is fixed to the upper portion of the deodorizing box 15 for drawing air. An air cleaner 17 and a hot-air blower 18 are disposed in a space between the drying cauldron 11 and the deodorizing box 15. A valve mechanism 12 containing a butterfly valve is disposed at the upper surface side of the drying cauldron 11 for closing the route between the stool 6 and the drying cauldron 11. The lower portion of the stool 6 is connected to the upper opening of the valve mechanism 12. A driving mechanism 13 is placed on the upper surface of the drying cauldron 11 for stirring the raw sewage.

Figure 3:
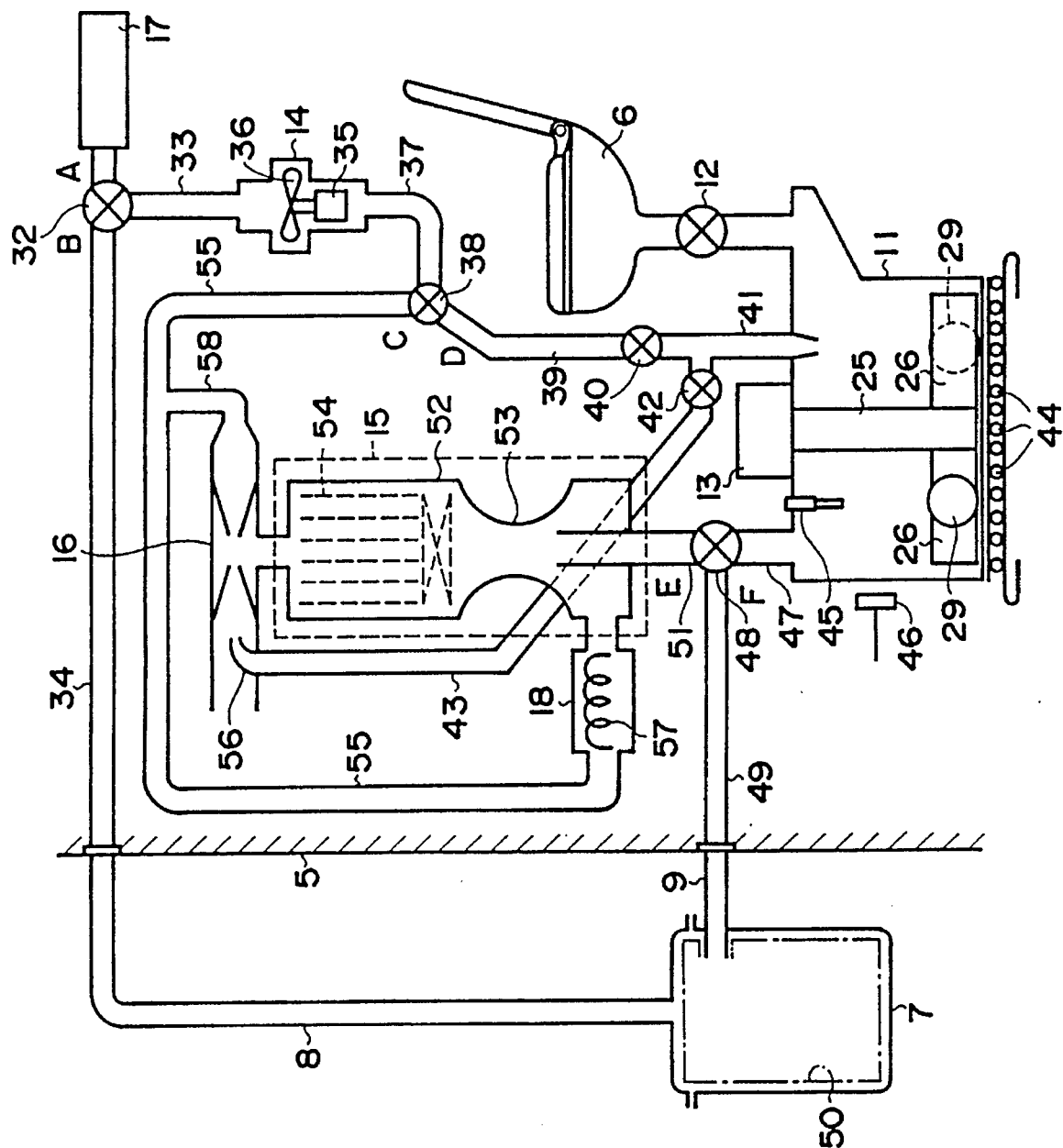
FIG. 3 is a schematic view showing the piping connection of various components of the apparatus of FIG 1.

FIG. 3 shows the piping connections of the various components as provided inside the disposal apparatus 5.

The valve mechanism 12 is connected between the lower opening of the stool 6 and the upper portion of the drying cauldron 11. The driving mechanism 13 is placed on the upper surface of the drying cauldron 11 and a rotary shaft 25 projects downwardly therefrom into the inside of the drying cauldron 11. A plurality of stirring blades 26 are fixed to and project radially outwardly of the rotary shaft 25 so as to be rotatable adjacent the bottom of the drying cauldron 11. A multitude of heat-holding balls 29 which are spherical and formed ceramic of heat-holding materials such as aluminum dioxide, iron, ceramic, etc. are contained inside the drying cauldron 11. A heater 44 is brought into contact with the bottom surface of the drying cauldron 11. A liquid surface sensor 45 is fixed to the upper portion of the inside of the drying cauldron 11 for detecting the liquid surface level of the raw sewage contained in the drying cauldron 11, and temperature sensor 46 is fixed to the outer surface of the drying cauldron 11 for detecting variation in temperature on the surface of the drying cauldron 11.

The air cleaner 17 contains therein a paper or cloth of small mesh of removing the dust from the air. There is provided a selector valve 32 which can be switched to A and B directions or sides. The air cleaner 17 is connected to the A side of the selector valve 32. A suction pipe 33 is connected to a common side of the selector valve 32. A suction side of the air blower 14 is connected to the suction pipe 33. A motor 35 and a fan 36 which is driven by the motor 35 are contained in the air blower 14. An air supply pipe 37 is connected to the discharge side of the air blower 14. There is provided a selector valve 38 which can be switched to C and D directions or sides. The air supply pipe 37 is connected to the common side of the selector valve 38. A preheating pipe 55 is connected to the C side of the selector valve 38 and an air supply pipe 39 is connected to the D side of the selector valve 38. A closing valve 40 for opening and closing the air flow route is connected to the air supply pipe 39 and is also connected to an ejection pipe 41. The ejection pipe 41 is connected to the upper portion of the drying cauldron 11 and has a tip end which is nozzle-shaped and opens into the drying cauldron 11.

An evaporation pipe 47 is connected to the upper opening of the drying cauldron 11 for discharging the vapor evaporated from the raw sewage in the drying cauldron 11. There is provided a selector valve 48 which can be switched to E and F directions or sides. The evaporation pipe 47 is connected to the common side of the selector valve 48. A discharge pipe 51 is connected to the E side of the selector valve 48. A catalyst box 52 is surrounded by the heat insulating member and is accommodated inside the deodorizing box 15 and the tip end of the discharge pipe 51 extends to and is inserted into the catalyst box 52. The catalyst box 52 forms an airtight space and has a throttled portion 53 at the center thereof for narrowing the flow route. The tip end of the discharge pipe 51 is positioned at the portion close the throttled portion 53 and is disposed so as to draw the fresh air from the discharge pipe 51 when the air flowing in the catalyst box 52 generates an ejector effect. A catalyst 54 formed of platinum, etc., is filled in the catalyst box 52 and is positioned downstream relative the throttled portion 53.

The suction side of the ejector 16 fixed to the deodorizing box 15 is connected to the discharge side of the catalyst box 52 and the air blower side of the ejector 16 is connected to a branched pipe 58. The branched pipe 58 is connected to the side surface of a preheating pipe 55. A terminal end of the preheating pipe 55 is connected to a box-shaped hot-air blower 18, the discharge side of which is connected to the side surface of the catalyst box 52 upstream relative to the throttled portion 53. The hot-air blower 18 is provided for preheating the inside of the catalyst box 52 and accommodates therein a catalyst heater 57 for generating heat when energized. The ejection pipe 41 is branched midway thereof and is connected to a closing valve 42 at the branched side for opening and closing the flow route. The closing valve 42 is connected to a bypass pipe 43. An introduction port 56 is defined at the end of the bypass pipe 43 and communicates with the discharge side of the ejector 16.

A dust pipe 49 is connected to the F side of the selector valve 48 and the terminal end of the dust pipe 49 is connected to the discharge hose 9 outside the apparatus 5. A suction pipe 34 is connected to the B side of the selector valve 32 and has a terminal end connected to the suction hose 8 outside the apparatus 5. The tip end of the suction hose 8 communicates with the inside of the dust collector 7. The dust collector 7 contains therein a dust bag 50 which is formed of a filter cloth having small mesh and is connected to the opening end of the discharge hose 9.

Figure 4:
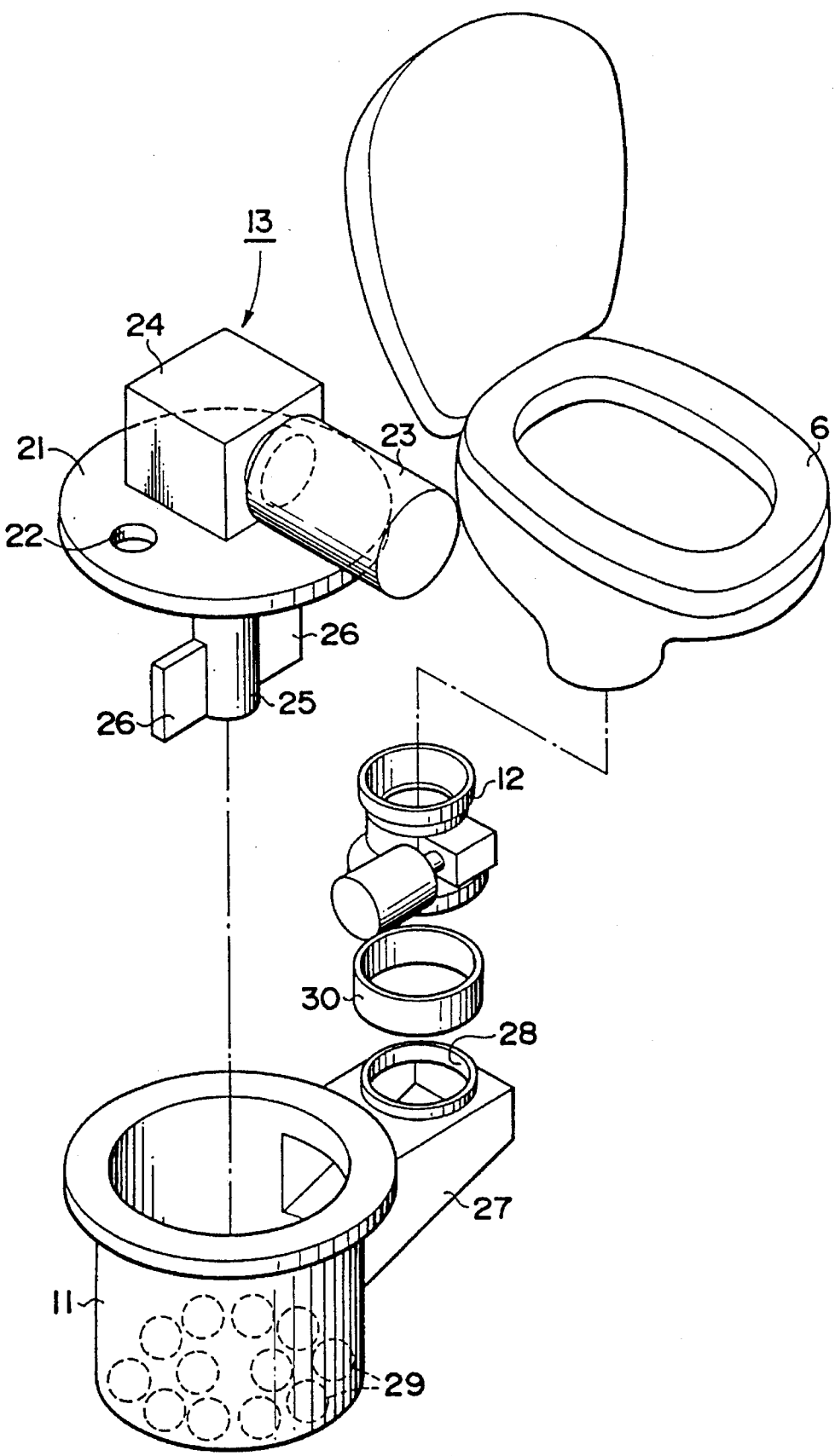
FIG. 4 is an exploded perspective view showing the relation between the stool and the drying cauldron of FIG. 1.

FIG. 4 shows the relation between the stool 6 and the drying cauldron 11. The drying cauldron 11 has an open flange-shaped upper end, and is closed at the lower portion thereof. One side surface of the drying cauldron 11 extends horizontally to form an introduction portion 27. The introduction portion 27 has a lower surface inclined relative to the drying cauldron 11 for introducing the raw sewage into the drying cauldron 11, and a horizontal upper surface in which an introduction port 28 is defined. A ring-shaped joint 30 is connected to the upper portion of the introduction port 28, and the valve mechanism 12 is placed on the upper portion of the joint 30. The raw sewage from stool 6 passes through the valve mechanism 12 and flows into the drying cauldron 11 through the introduction portion 27. The heat-holding balls 29 are contained in the drying cauldron 11.

The upper flange of the drying cauldron 11 is brought into contact with a disk-shaped cauldron cover 21 to close the cauldron 11. A gear box 24 constituting the driving mechanism 13 is placed on the upper surface of the cover 21. A stirring motor 23 serving as a power source is connected to the gear box 24. The rotary shaft 25 penetrates the cover 21 and extends downward from the gear box 24. The stirring blades 26 project outwardly in opposite directions from the lower portion of the rotary shaft 25. An opening 22 extends through the cover 21 for supplying air to the drying cauldron 11.

Figure 5:
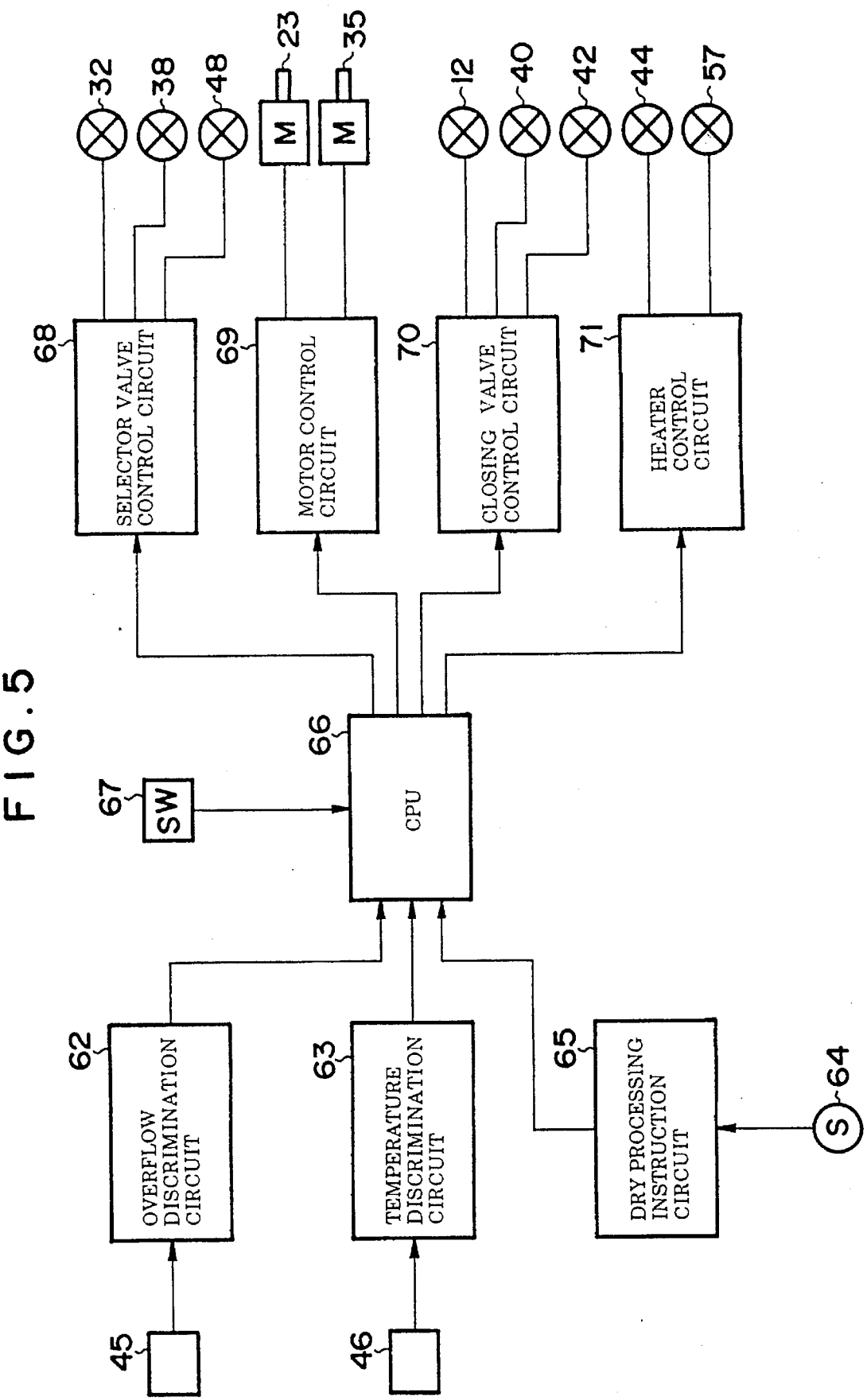
FIG. 5 is a block diagram of a control system for the apparatus of FIG. 1.
Figure 7:
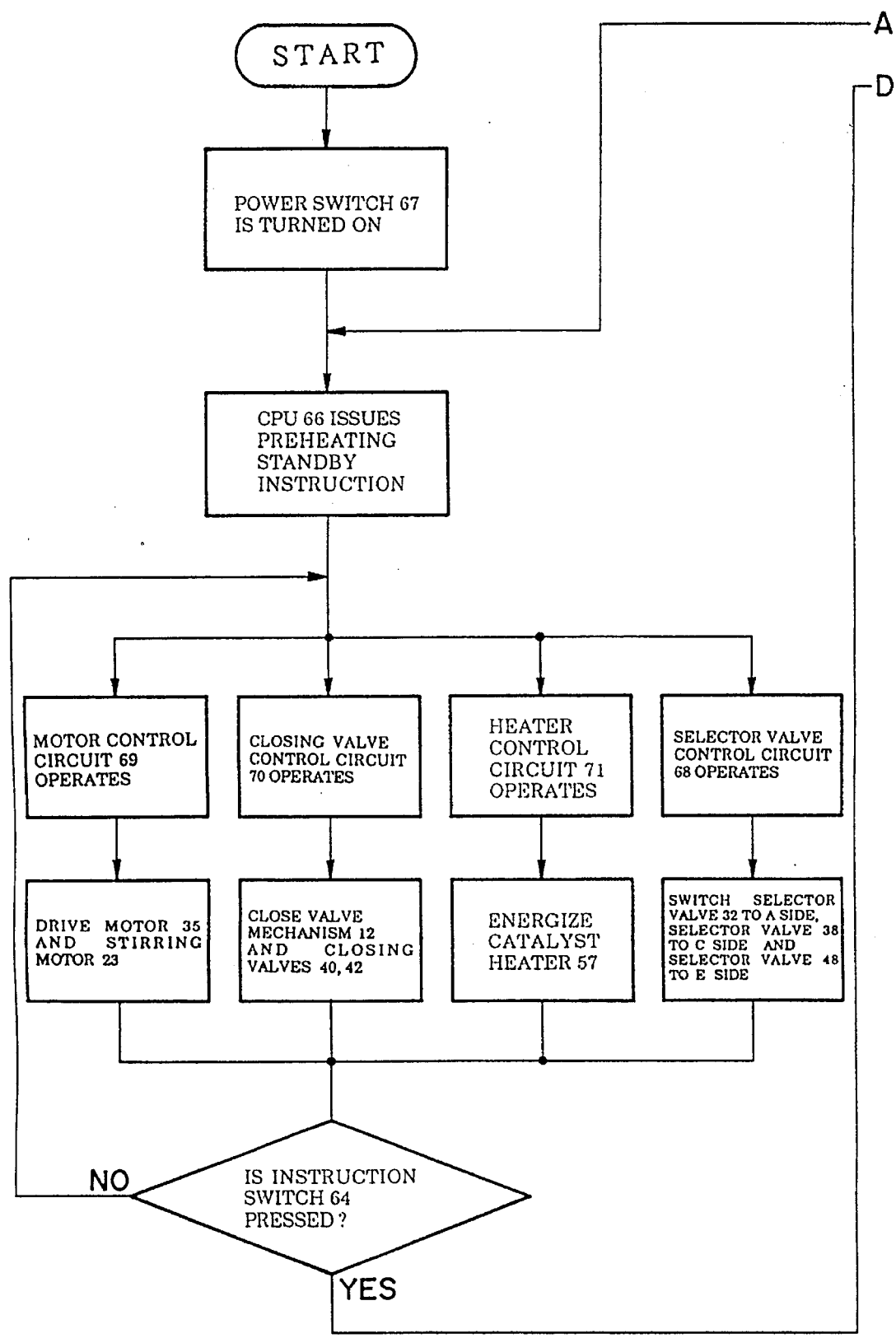
FIGS. 7 to 10 are flow charts showing operations of the apparatus of FIG. 1.
Figure 8:
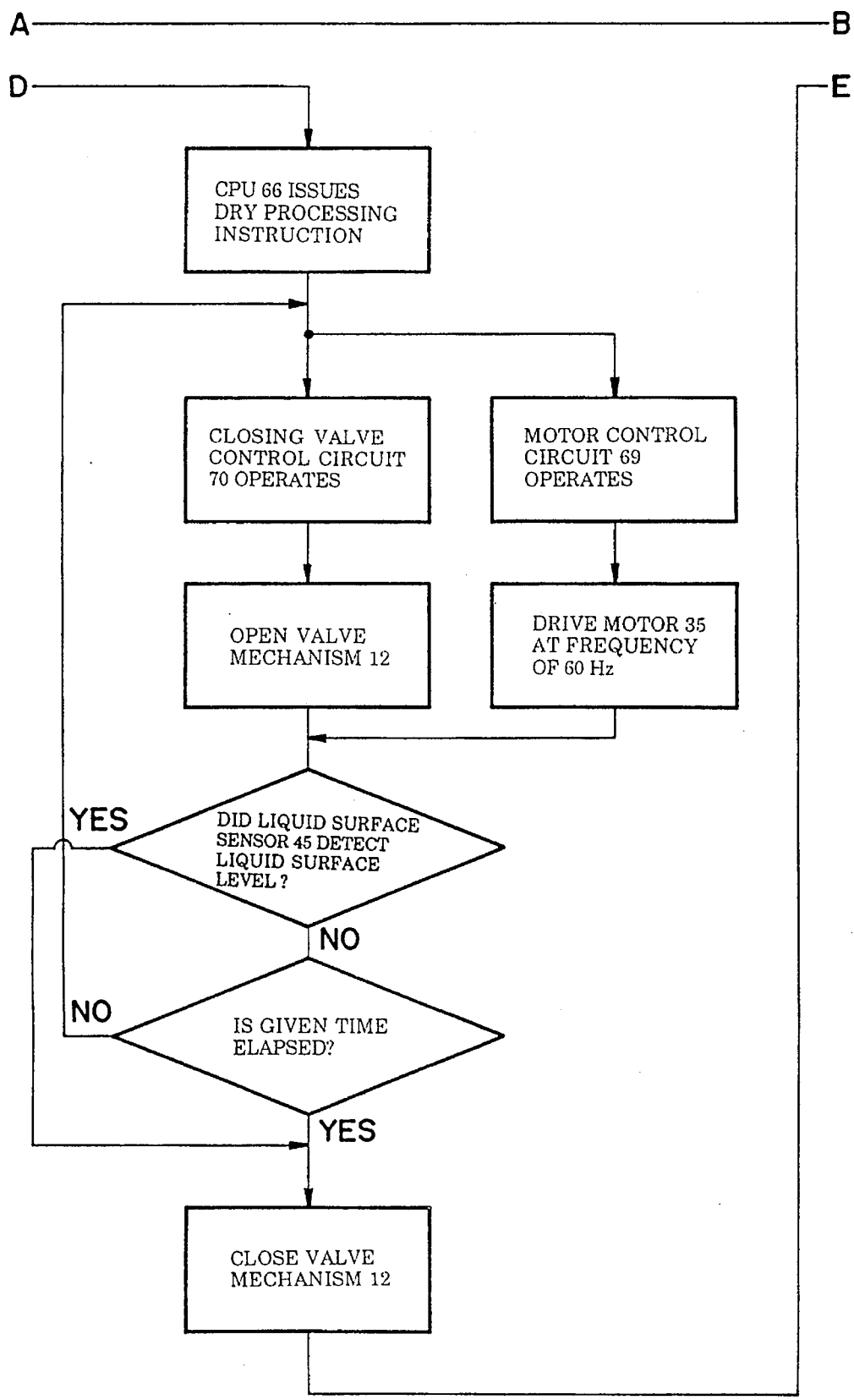
Figure 9:
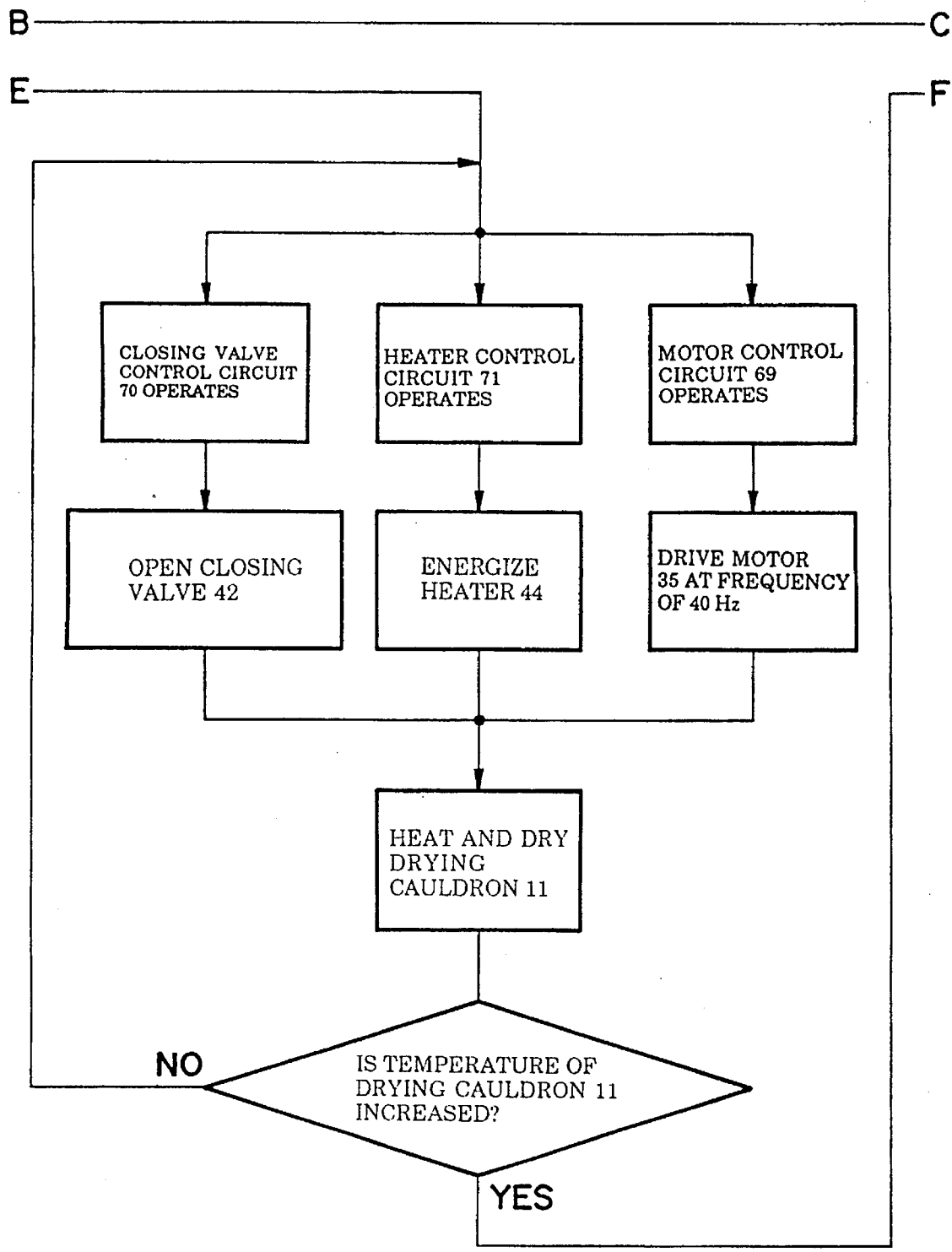
Figure 10:
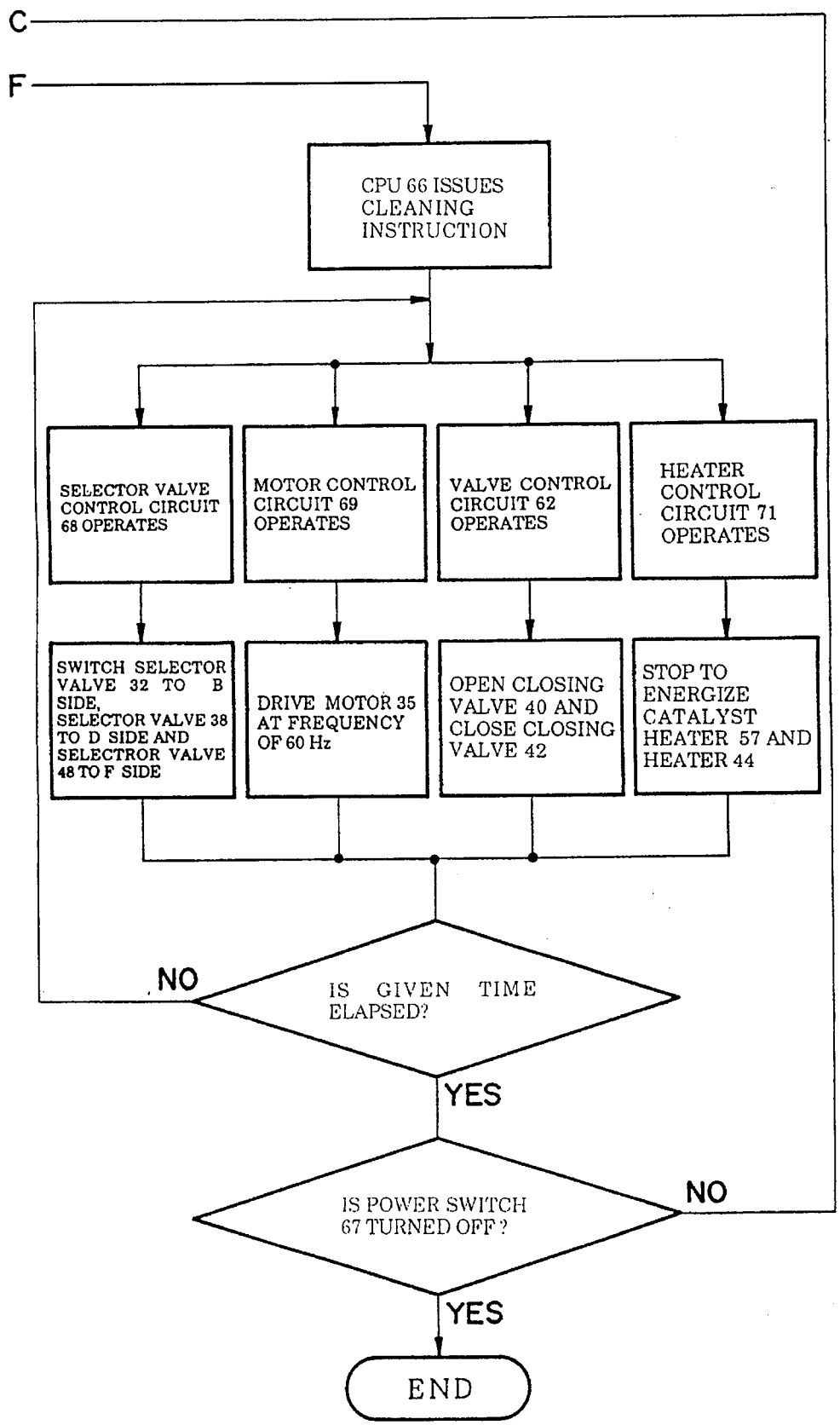
Figure 11:
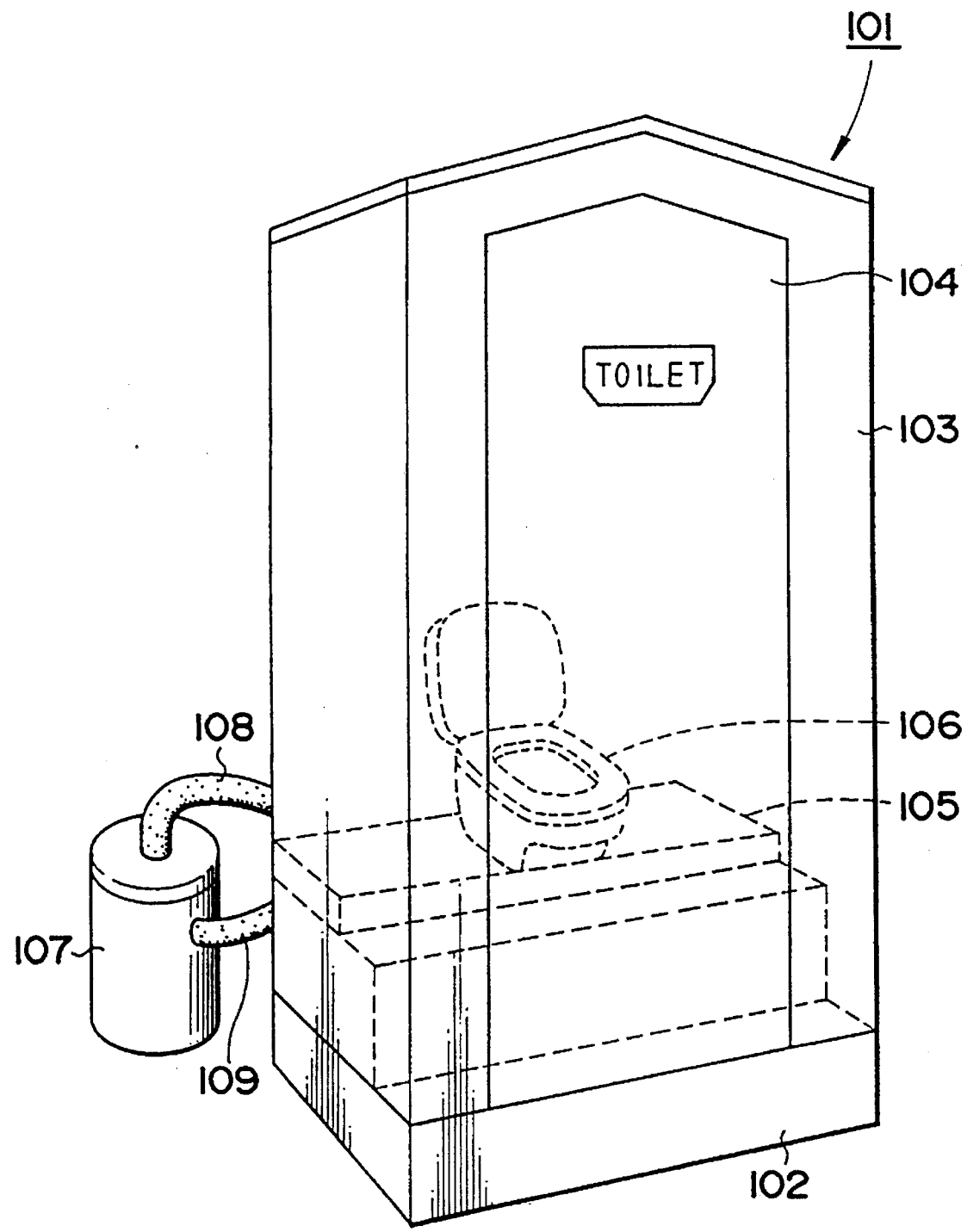
FIG. 11 is a perspective view of a raw sewage disposal apparatus employed in a temporary toilet according to a second embodiment of the present invention.

FIG. 5 is a block diagram showing an electric control system for controlling the entire disposal apparatus 5. In FIG. 5, an output of the liquid surface sensor 45 is connected to an overflow discrimination circuit 62. An output of temperature sensor 46 is connected to a temperature discrimination circuit 63. An output of an instruction switch 64 representing the completion of the use of the temporary toilet 1 by the user is connected to a dry processing instruction circuit 65. Outputs of these circuits 62, 63 and 65 are connected to a CPU 66 (for example, composed of a microcomputer, etc.) which is connected to a power switch 67 for starting all the operations of the apparatus 5.

Control outputs from the CPU 66 are connected to a selector valve control circuit 68, a motor control circuit 69, a closing valve control circuit 70 and a heater control circuit 71 which respectively independently control their functions when receiving a control signal from the CPU 66. Selector valves 32, 38 and 48 are connected to the output of the selective valve control circuit 68, the stirring motor 23 and the motor 35 are connected to the output of the motor control circuit 69, the valve mechanism 12 and the closing valves 40, 42 are connected to the output of the closing valve control circuit 70, and the heater 44 and the catalyst heater 57 are connected to the output of the heater control circuit 71.

The operation of the raw sewage disposal apparatus 5 according to this first embodiment will be described with reference to FIGS. 6 to 10.

Before starting a drying operation utilizing the raw sewage disposal apparatus 5, the main portions of the disposal apparatus 5 must be preheated and kept in standby condition so as to dispose of the raw sewage immediately after the use of the temporary toilet 1.

The power switch 67 is turned on to issue a starting signal to the CPU 66 representing the start of use of the raw sewage disposal apparatus 5. The CPU 66, upon reception of this signal, supplies a preheating signal to the selector valve control circuit 68, the motor control circuit 69, the closing valve control circuit 70 and the heater control circuit 71. The selector valve control circuit 68, upon reception of the preheating signal, switches the selector valve 32, the selector valve 38 and the closing valve 42 to thereby connect the selector valve 32 to the A side, the selector valve 38 to the C side and the selector valve 48 to the E side. At the same time, the closing valve control circuit 70 closes the valve mechanism 12, the closing valve 40 and the closing valve 42. The motor control circuit 69 supplies the preheating signal to the motor 35 and the stirring motor 23, thereby operating them so that the motor 35 is rotated at low frequency of 40 Hz and the stirring motor 23 is rotated to thereby rotate the shaft 25 by way of the gear box 24. The heater control circuit 71 energizes and heats the catalyst heater 57 to thereby warm the hot-air blower 18.

In this state, the fan 36 is driven by the motor 35 to thereby draw fresh air from the atmosphere by way of the air cleaner 17, the selector valve 32 and the suction pipe 33. The fresh air drawn by the fan 36, namely, by the operation of the air blower 14 flows to the ejector 16 by way of the air supply pipe 37, the selector valve 38, the preheating pipe 55 and the branched pipe 58. Since the central portion of the ejector 16 is throttled, the air passes through the ejector 16 at high speed, and hence negative pressure is generated therein for drawing or sucking in the air from the catalyst box 52. A part of the air supplied through the preheating pipe 55 flows inside the hot-air blower 18 and is heated by the catalyst heater 57 in the hot-air blower 18. The air in the catalyst box 52 is drawn by the ejector 16 and the air warmed by the hot-air blower 18 as the air passes through the catalyst box 52 and is then discharged outside. When the air heated by the catalyst heater 57 passes through the catalyst box 52, this heated air warms the catalyst 54 until the catalyst 54 reaches a predetermined temperature. The reason why the catalyst 54 is warmed by the heated air is that the catalyst 54 has to be maintained at least at the given temperature so as to perform the oxidation-reduction property. The catalyst 54 is always maintained at the given temperature by the circulation of air from the air blower 14 through the preheating pipe 55, the hot-air blower 18 and the catalyst box 52. The raw sewage disposal apparatus 5 is under the standby state by this preheating operation.

When the raw sewage disposal apparatus 5 maintains this standby operation due to the preheating condition, the temporary toilet 1 can be used by a user. When using the temporary toilet 1, the user opens the door 4 and enters the house 3 and discharges the raw sewage toward the stool 6. The discharged raw sewage is temporarily stored in the stool 6 in the upper portion of the closed valve mechanism 12.

The user presses the instruction switch 64 representing the completion of use so as to introduce the raw sewage into the drying cauldron 11, whereby the evaporation drying operation can start.

When the instruction switch 64 is pressed by the user, the instruction signal is issued which is supplied to the CPU 66 by way of the dry processing instruction circuit 65. The CPU 66, upon reception of the instruction signal, discriminates that the drying operation must start and opens the valve mechanism 12 by way of the closing valve control circuit 70. When the valve mechanism 12 is opened, the raw sewage stored in the stool 6 passes through the butterfly valve of the valve mechanism 12 and also passes through the joint 30, the introduction port 28 and dropped inside the introduction portion 27. Since the introduction portion 27 is inclined toward the drying cauldron 11, the raw sewage flows toward and is stored in the drying cauldron 11. The closing valve control circuit 70 stops the operation signal after the valve mechanism 12 is opened for a given time to thereby close the valve mechanism 12 so that the communication between the stool 6 and the drying cauldron 11 is interrupted. This prevents the smell of the sewage introduced into the drying cauldron 11 from being diffused outside.

The motor control circuit 69, at the same time when the raw sewage is introduced into the drying cauldron 11, supplies power having a high frequency of 60 Hz to the motor 35 so that the fan 36 is rotated at high speed by the motor 35. Accordingly, the amount of fresh air which is drawn by the air blower 14 by way of air cleaner 17 is increased, and the increased fresh air is supplied to the ejector 16 by the preheating pipe 55 and the branched pipe 58. When the amount of fresh air which flows in the ejector 16 is increased, the negative pressure which is generated in the central throttled portion of the ejector 16 is increased so that the ejector 16 more strongly draws the air in the catalyst box 52. Since the selector valve 48 is connected to the E side in the standby condition, as mentioned above, and at the same time the valve mechanism 12 is temporarily opened, the drying cauldron 11 communicates with the atmosphere and the air in the drying cauldron 11 flows into the catalyst box 52 by way of the evaporation pipe 47, the selector valve 48 and the discharge pipe 51. This is caused by the negative pressure in the drying cauldron 11 for preventing the bad smell of the raw sewage in the drying cauldron 11 from being leaked outside the drying cauldron 11. The air which is drawn in the catalyst box 52 passes through the throttled portion 53 and then contacts the catalyst 54 which has already been warmed by the hot-air blower 18. The air is subjected to oxidation-reduction upon contacting the catalyst 54 and is changed into an odorless gas and then is diffused into the atmosphere by the ejector 16.

If the amount of raw sewage in the drying cauldron 11 exceeds an allowable amount, then the level of the liquid surface of the raw sewage is detected by the sensor 45. The sensor 45 then issues a signal 11 which is supplied to the overflow discrimination circuit 62. The circuit 62 also issues the same signal as the one supplied by the sensor 45, which signal is supplied to the CPU 66. The CPU 66, upon reception of this signal, instructs the closing valve control circuit 70 to quickly close the valve mechanism 12 so that further raw sewage is prevented from being introduced into the drying cauldron 11. Use of the stool 6 is stopped during this time until the drying operation of the raw sewage is completed.

After valve mechanism 12 is opened by the CPU 66 for a given time (about 10 seconds) and then reclosed, the raw sewage in the drying cauldron 11 is subjected to the drying process by the evaporation thereof. First, the CPU 66 supplies the control signal to the motor control circuit 69 so that the motor control circuit 69 lowers the frequency of power to be supplied to the motor 35 to 40 Hz, thereby lowering the rotation of the fan 36. As a result, the amount of air to be supplied by the air blower 14 is returned to a normal amount. Then the CPU 66 supplies the control signal to the closing valve control circuit 70 so that the closing valve control circuit 70 opens the closing valve 42. At the same time, the CPU 66 supplies the control signal to the heater control circuit 71 so as to supply the power to the heater 44 so that the heater 44 heats the outer lower portion of the drying cauldron 11.

When the power is supplied for energizing the heater 44, the heater 44 is heated so as to heat the outer lower portion of the drying cauldron 11 until the temperature of the raw sewage stored in the drying cauldron 11 reaches the boiling point, whereby the liquid component which is the primary component of the raw sewage is evaporated as vapor.

Since the motor control circuit 69 continues to operate the stirring motor 23, the rotating force of the stirring motor 23 is reduced by the gear box 24 and the thus reduced rotating force rotates the rotary shaft 25. Accordingly, the stirring blades 26 are rotated adjacent the bottom portion of the drying cauldron 11 so as to stir the introduced raw sewage and the heat-holding balls 29. When the raw sewage is mixed, it is warmed uniformly and is also heated by the heat accumulated in the heat-holding balls 29 which is transmitted from the surface thereof to the surrounding raw sewage. Since the heat-holding balls have large spherical surface areas, the heat transmission to the raw sewage is large so that the drying speed of the raw sewage is expedited. As a result, the liquid component of the raw sewage is gradually changed into vapor and is evaporated.

The fresh air which is drawn from the atmosphere by the air blower 14, i.e., by the fan 36 through the air cleaner 17 is transmitted to the ejector 16 by way of the air supply pipe 37, the selector valve 38, the preheating pipe 55 and the branched pipe 58, which permits the central portion of the ejector 16 to always be under negative pressure so as to draw the air in the catalyst box 52. A part of the fresh air passes through the preheating pipe 55 and the hot-air blower 18 where it is heated and the heated air is introduced inside the catalyst box 52, whereby the catalyst 54 is always warmed. A small amount of air is introduced from the introduction port 56 provided at the discharge side of the ejector 16 into the bypass pipe 43 and passes through the closing valve 42 and the jetting pipe 41 and is then jetted inside the drying cauldron 11 from the nozzle provided at the lower end of the jetting pipe 41. This jetted air causes the evaporated vapor to flow toward the evaporation pipe 47, and the oxygen contained in the air oxides the raw sewage which is heated inside the drying cauldron 11. The liquid component which is evaporated in the drying cauldron 11 passes through the evaporation pipe 47, the selector valve 48, the discharge pipe 51 and is then drawn by the ejecting operation of the ejector 16 at the throttled portion 53 thereof, and thereafter is passes through the catalyst 54 and is finally diffused outside. When the evaporated vapor and the air in the drying cauldron 11 flow into the catalyst box 52, the bad smell (such as urea and ammonium, etc.) contacts the catalyst 54 and is subjected to oxidation-reduction. As a result, the bad smell becomes odorless and is diffused outside.

In such a manner, when the circulation of the air and the heating of the drying cauldron 11 by the heater 44 are continuously performed, the liquid component of the raw sewage is partly evaporated and all the liquid component of the raw sewage is finally evaporated, whereby the inside of the drying cauldron 11 is dried. When the liquid component of the raw sewage in the drying cauldron 11 is evaporated, the boiling temperature cannot be maintained so that the temperature of the outer wall of the drying cauldron 11 is increased, which is detected by the temperature sensor 46. At this time, the temperature sensor 46 issues a detecting signal which is transmitted to the temperature discrimination circuit 63. The circuit 63 discriminates that all the liquid component in the drying cauldron 11 is evaporated when the temperature of the outer wall of the drying cauldron 11 rises sharply and exceeds the boiling temperature, and it issues a discrimination signal to the CPU 66 so as to instruct the CPU 66 to stop the drying operation of the raw sewage and move to the next operation.

The liquid component of the raw sewage in the drying cauldron 11 is evaporated due to both the heating of the drying cauldron 11 by the heater 44 and the stirring operation of the raw sewage by the stirring blades 26 and the heat-holding balls 29. The component such as fibrous substance, etc., which is not evaporated in the raw sewage finally remains in the drying cauldron 11 as residual substances. If the residual substances are allowed to remain in the drying cauldron 11, they will stick to the inner wall of the drying cauldron 11 when it is used for a long period of time, whereby the drying operation can eventually not be performed. Accordingly, it is necessary to perform a cleaning operation for removing the residual substances and dust remaining in the drying cauldron 11 every time the drying operation is completed. This cleaning operation is automatically started when the sharp increase of the temperature of the drying cauldron 11 is discriminated by the temperature discrimination circuit 63.

When the liquid component in the drying cauldron 11 is evaporated, the temperature of the surface of the drying cauldron 11 is increased. The temperature discrimination circuit 63 discriminates, based on the change of temperature of the surface of the drying cauldron 11, the completion of the drying operation and issues a discrimination signal to the CPU 66. The CPU 66 stops the drying operation upon reception of the discrimination signal and immediately moves to the cleaning operation. The CPU 66 supplies a control signal to the selector valve control circuit 68, the motor control circuit 69, the closing valve control circuit 70 and the heater control circuit 71. The heater control circuit 71 de-energies the catalyst heater 57 and the heater 44 to thereby stop the generation of the hot air and the heating of the drying cauldron 11. While the motor control circuit 69 continues to operate the motor 35 and the stirring motor 23, it increases the frequency of the power to be supplied to the motor 35 to 60 Hz, thereby increasing the rotating speed of the fan 36 so that the amount of air blown from the air blower 14 is increased, which contributes to the effective performance of the blowing of the dust, as described below.

The selector valve control circuit 68 switches the selector valve 32 to the B side, the selector valve 38 to the D side and the selector valve 48 to the F side. The closing valve control circuit 70 opens the closing valve 40 and closes the closing valve 42. By the switching of these selector valves 32, 38 and 48 to the B, D, and F sides, there is formed a closed air circulation route by which the air flows through the air blower 14, the air supply pipe 37, the selector valve 38, the air supply pipe 39, the closing valve 40, the ejection pipe 41, the drying cauldron 11, the evaporation pipe 47, the selector valve 48, the discharge hose 9, the dust collector 7, the suction hose 8, the suction pipe 34, the selector valve 32 and the suction pipe 33. Accordingly, the large amount of air discharged from the air blower 14 is circulated at high speed in this closed air circulation route since the fan 36 in the air blower 14 rotates at high speed. The air reaching the ejection pipe 41 is jetted from the nozzle provided at the lower end thereof toward the inside of the drying cauldron 11. The thus jetted air blows up the residual substances and dust remaining inside the drying cauldron 11 and causes the powdered dust and residual substances to pass through the evaporation pipe 47, the selector valve 48, the dust pipe 49 and the discharge hose 9 and to move into the dust bag 50 provided inside the dust collector 7. Since the dust bag 50 is formed of a cloth having small mesh, the dust and residual substances are caught by the dust bag 50, and the air alone flows toward the suction hose 8. When the dust and residual substances in the drying cauldron 11 is blown up by the air jetted at high speed in the closed air circulation route, the stirring motor 23 continues to operate so that the rotary shaft 25 and the stirring blades 26 are rotated inside the drying cauldron 11. As a result, the heat-holding balls 29 are rotated adjacent to the bottom portion of the drying cauldron 11 to thereby break the residual substances remaining in the drying cauldron 11 into small powdered pieces, whereby the residual substances are easily flown and blown up by the air under high pressure.

With such an operation, the residual substances and dust remaining in the drying cauldron 11 are blown up with the air and they are removed from the air in the dust collector 7, whereby the cleaning of the drying cauldron 11 is automatically performed. When the cleaning operation is continuously performed for a given time, the CPU 66 judges the completion of the cleaning operation and supplies a control signal to the selector valve control circuit 68, the motor control circuit 69, the closing valve control circuit 70 and the heater control circuit 71 for returning them to the standby condition, namely, for rotating the motor 35 at the low frequency of 40 Hz, supplying the power to heat the catalyst heater 57, switching the selector valve 32 to the A side, the selector valve 38 to the C side, the selector valve 48 to the E side and closing the closing valve 40. By the switching of these selector valves, the raw sewage disposal apparatus 5 is returned to the preheating standby condition for the next user.

In such a manner, the raw sewage disposal apparatus 5 automatically repeats the cycles of the preheating standby, the raw sewage introduction, the drying and the cleaning operations. As a result, even though the raw sewage is subjected to the drying and evaporating operations in the airtight drying cauldron 11, the residual substances and the dust do not remain in the drying cauldron 11, which ensures an extended use of the disposal apparatus 5.

As mentioned above, the operations are very hygienic and easy. The bad smell is prevented from being diffused by using a catalyst in the evaporating operation of the raw sewage, the vapor does not directly contact the heater which is provided for heating the catalyst so that the vapor and the catalyst are indirectly heated by the catalyst heater. Accordingly, the disposal apparatus can be used for a long period of time since the members such as the catalyst heater, etc., are not easily corroded nor easily broken.

Second Embodiment (FIGS. 11 to 24)

A raw sewage disposal apparatus according to a second embodiment will now be described with reference to FIGS. 11 to 24.

An outer frame of a temporary toilet 101 is made of, e.g. plastic or reinforced synthetic resin and has a cubic box-like shape. The temporary toilet 101 has a base 102 which can be supported on the ground at the bottom portion thereof. The base 102 has a cubic shape and has a roofed house 103 fixed thereto at the upper portion thereof. A door 104 is attached to the front surface of the house 103 and opens forward thereof.

The temporary toilet 101 has inside thereof a raw sewage disposal apparatus 105 which is fixed to an upper portion of the base 102. A stool 106 is fixed to an upper portion of the disposal apparatus 105 and the user using the temporary toilet can utilize the stool 106 for discharging the raw sewage. A hollow dust collector 107 is disposed at the back of the house 103 and communicates with disposal apparatus 105 through suction hose 108 and discharge hose 109.

Figure 12:
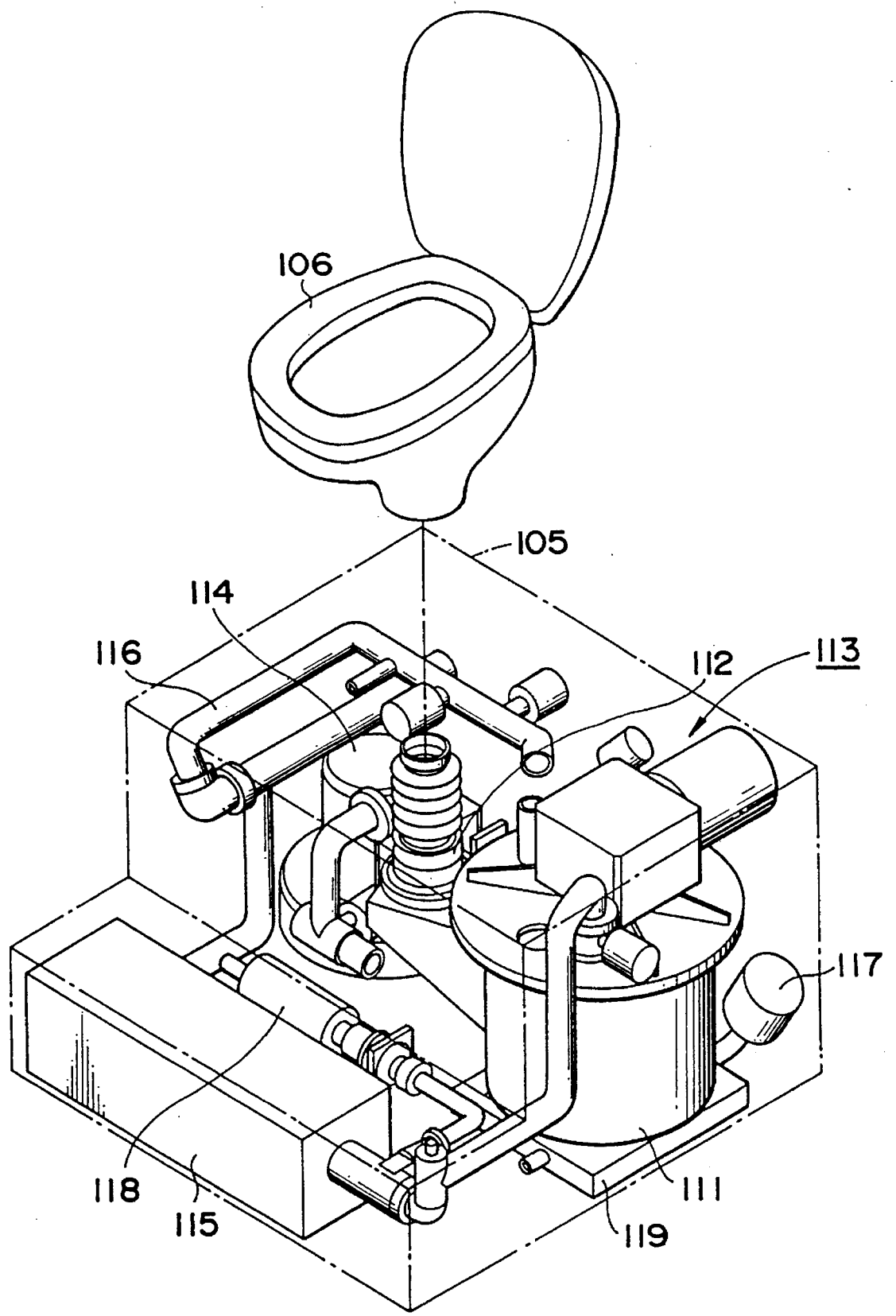
FIG. 12 is a schematic perspective view showing the internal structure of the apparatus of FIG. 11.

FIG. 12 is a view showing the inside structure of the apparatus 105 wherein main parts of disposal apparatus 105 are shown by solid lines and piping connecting each part is shown by bold lines but flow routes are omitted. The disposal apparatus 105 is assembled as a unit which is capable of operating by itself, and generally comprises a drying mechanism and a catalyst oxidation-reduction mechanism and a heating mechanism.

As shown in FIG. 12, a cylindrical drying cauldron 111 is fixed to the right uppermost portion of the disposal apparatus 105 and an air blower 114 is fixed to the left side of the drying cauldron 111 for drawing the fresh air from the atmosphere and circulating the fresh air in the disposal apparatus 105. A rectangular parallelepiped deodorizing box 115 is fixed to the disposal apparatus 105 at the front portion in front of the drying cauldron 111 and the air blower 114. The deodorizing box 115 accommodates therein a catalyst and is surrounded by a heat insulating member. A hot-air blower 118 is disposed between the deodorizing box 115 and the air blower 114. An ejector 116 is disposed over the air blower 114 for drawing the fresh air. A driving mechanism 113 is mounted on the upper portion of the drying cauldron 111 for rotating stirring blades in the drying cauldron 111. A valve mechanism 112 is provided substantially at the central portion of the disposal apparatus 105 and is mounted on the upper side surface of the drying cauldron 111. The valve mechanism 112 communicates with the lower portion of the stool 106. A bellows is disposed between the valve mechanism 112 and the stool 106 for adjusting the height of the stool 106 and is free in all directions.

Figure 13:
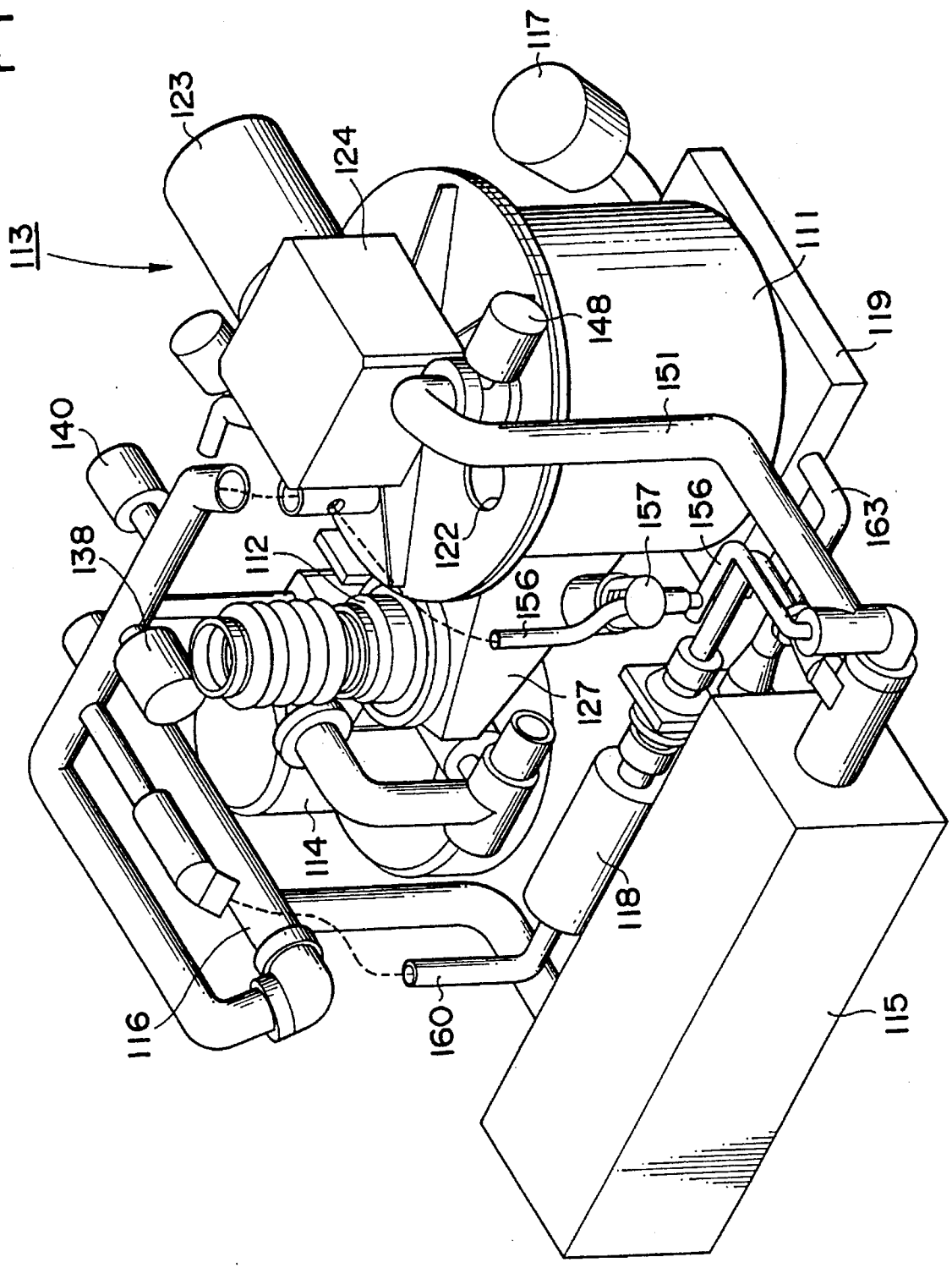
FIG. 13 is a schematic perspective view showing piping connections of the apparatus of FIG. 11.

FIG. 13 is an enlarged view showing the structures of components which are disposed inside the disposal apparatus of FIG. 12.

A flat box-shaped heater unit 119 serving as an induction heating mechanism is disposed under the drying cauldron 111. An air cleaner 117 is connected to the side surface of the heater unit 119 adjacent the rear lower portion of the disposal apparatus 105 for drawing fresh air from the atmosphere. An air supply pipe 163 is connected to the heater unit 119 at the front thereof. The driving mechanism 113 comprises a stirring motor 123 and a gear box 124 mounted on the upper portion of the drying cauldron 111. A selector valve 148 is connected close to the side surface of the gear box 124 and a discharge pipe 151 extends from the selector valve 148 and communicates with one side surface of the deodorizing box 115. A closing valve 157 is connected to a mixture pipe 156 which is branched from the discharge pipe 151 and a terminal end of the mixture pipe 156 communicates with the upper portion of the drying cauldron 111. A T-shaped central portion of the ejector 116 is connected to a discharge side of the deodorizing box 115 and a supply side of the ejector 116 is connected to a discharge side of the air blower 114.

Figure 14:
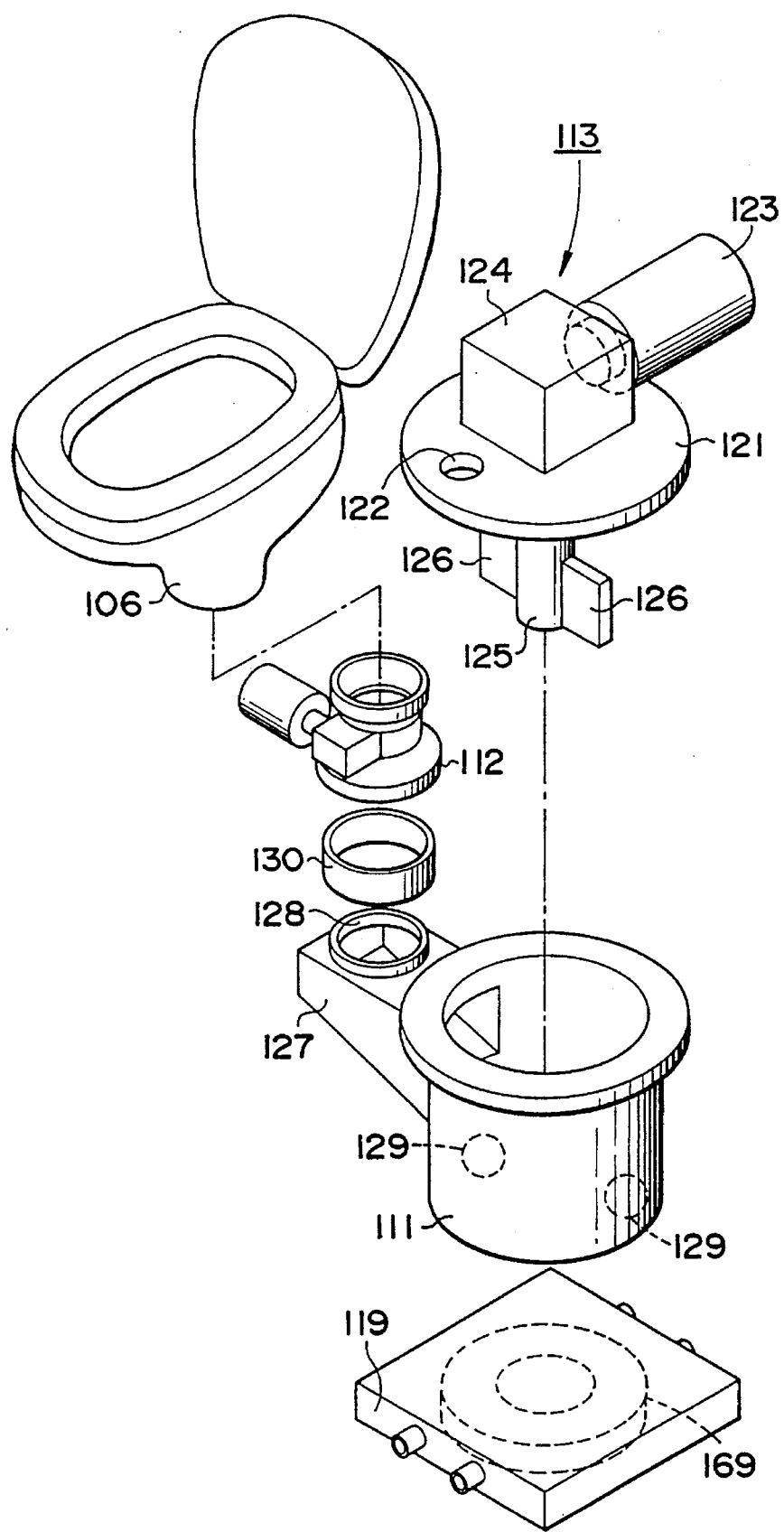
FIG. 14 is an exploded perspective view showing the relation between the stool and the drying cauldron of FIG. 11.

FIG. 14 is an exploded perspective view showing the stool 106 and the drying cauldron 111. The drying cauldron 111 is closed at the lower portion thereof and has a flange provided around the upper opening thereof. An introduction portion 127 extends horizontally from one side surface of the drying cauldron 111. The introduction portion 127 is inclined relative to the drying cauldron 111 at the inner lower surface thereof for permitting the raw sewage to flow into the drying cauldron 111. An introduction port 128 is defined on the upper flat surface of the introduction portion 127. A ring-shaped joint 130 is connected to the upper portion of the introduction port 128 and the valve mechanism 112 having a butterfly valve therein is mounted on the upper portion of the joint 130. The valve mechanism 112 has an upper opening which communicates with a lower opening of the stool 106 by way of a bellows, not shown. The raw sewage discharged toward the stool 106 passes through the valve mechanism 112 and flows into the introduction portion 127 through the introduction port 128 and then flows inside the drying cauldron 111 from the introduction portion 127.

A disk-shaped cauldron cover 121 is brought into contact with the flange around the upper opening of the drying cauldron 111 and closes the drying cauldron 111. The gear box 124 which accommodates therein a plurality of gears for reducing the rotating speed of the stirring motor 123 is mounted on the central upper surface of the cauldron cover 121. The stirring motor 123 as a power source is connected to the side surface of the gear box 124. A rotary shaft 125 perpendicularly penetrates the cauldron cover 121 and extends downward from the gear box 124. A plurality of stirring blades 126 project outwardly in opposite directions from the lower portion of the rotary shaft 125. A multitude of heat-holding balls 129 which are spherical and formed of iron, aluminum, etc. are contained inside the drying cauldron 111 and are rotated by the stirring blades 126. An opening 122 projects through the cauldron cover 121 for supplying air in the drying cauldron 111. The lower surface of the drying cauldron 111 is flat. The heater unit 119 is provided at a position close to the lower surface of the drying cauldron 111, leaving a slight interval therebetween. The heater unit 119 is formed of a material such as aluminum which is not affected by electromagnetic wave and is hollow for permitting the air to pass therethrough. A large-scale high-frequency electric coil 169 is disposed inside the heater unit 119 for generating the electromagnetic wave.

Figure 15:
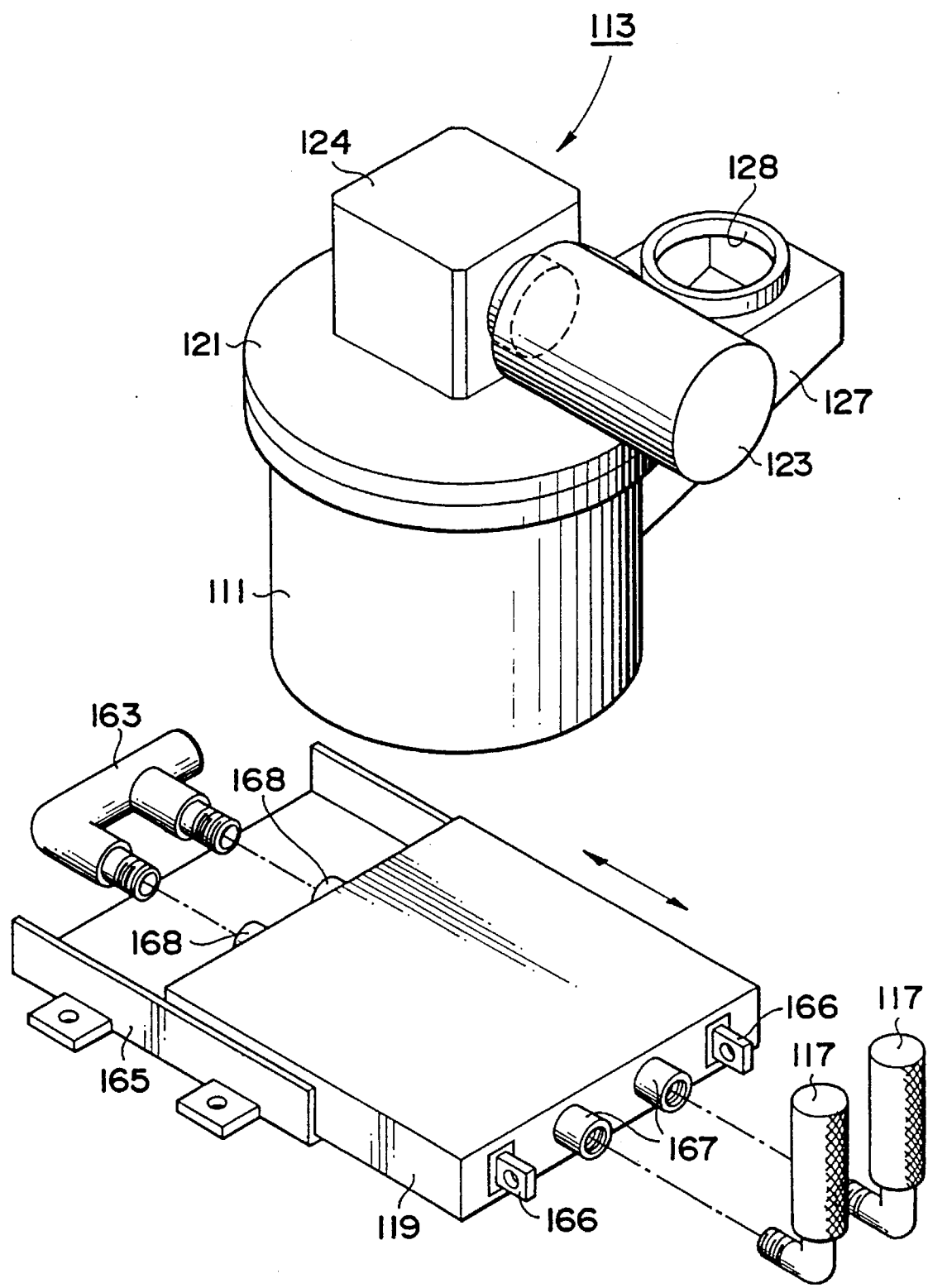
FIG. 15 is an enlarged exploded perspective view showing the relation between the heater unit and the drying cauldron of FIG. 14.

FIG. 15 shows the arrangement of the drying cauldron 111 and the heater unit 119. A guide rail 165 which is formed by bending a thin steel plate in a U-shape is fixed to the outer lower portion of the housing of the disposal apparatus 105. An air supply pipe 163 is disposed at a position close to one end of the guide rail 165 (left side in FIG. 15). The guide rail 165 is combined with the heater unit 119 so that the flat-shaped heater unit 119 can be detachably inserted into the guide rail 165. Joint pipes 168 protrude from one side surface of the heater unit 119 so as to communicate with the inside of the heater unit 119 and they are connected to the air supply pipe 163. Joint pipes 167 protrude from the other side surface of the heater unit 119 (namely, the rear side surface of the disposal apparatus 105) so as to communicate with the inside of the heater unit 119, and they are connected to the air cleaners 117. With such an arrangement, the heater unit 119 can be detachably attached to the air supply pipe 163 and air cleaners 117 and can be taken out of the raw sewage disposal apparatus 105 by sliding the guide rail 165. The heater unit 119 can be replaced with another when troubled. Electrodes 166 protrude from the side surface of the heater unit 119 at right and left sides of the joint pipes 167 for supplying electric power to the high-frequency coil for generating the electromagnetic wave. The heater unit 119 is disposed under the drying cauldron 111, leaving a slight interval or space therebetween, when the guide rail 165 is fixed to the heater unit 119.

Figure 16:
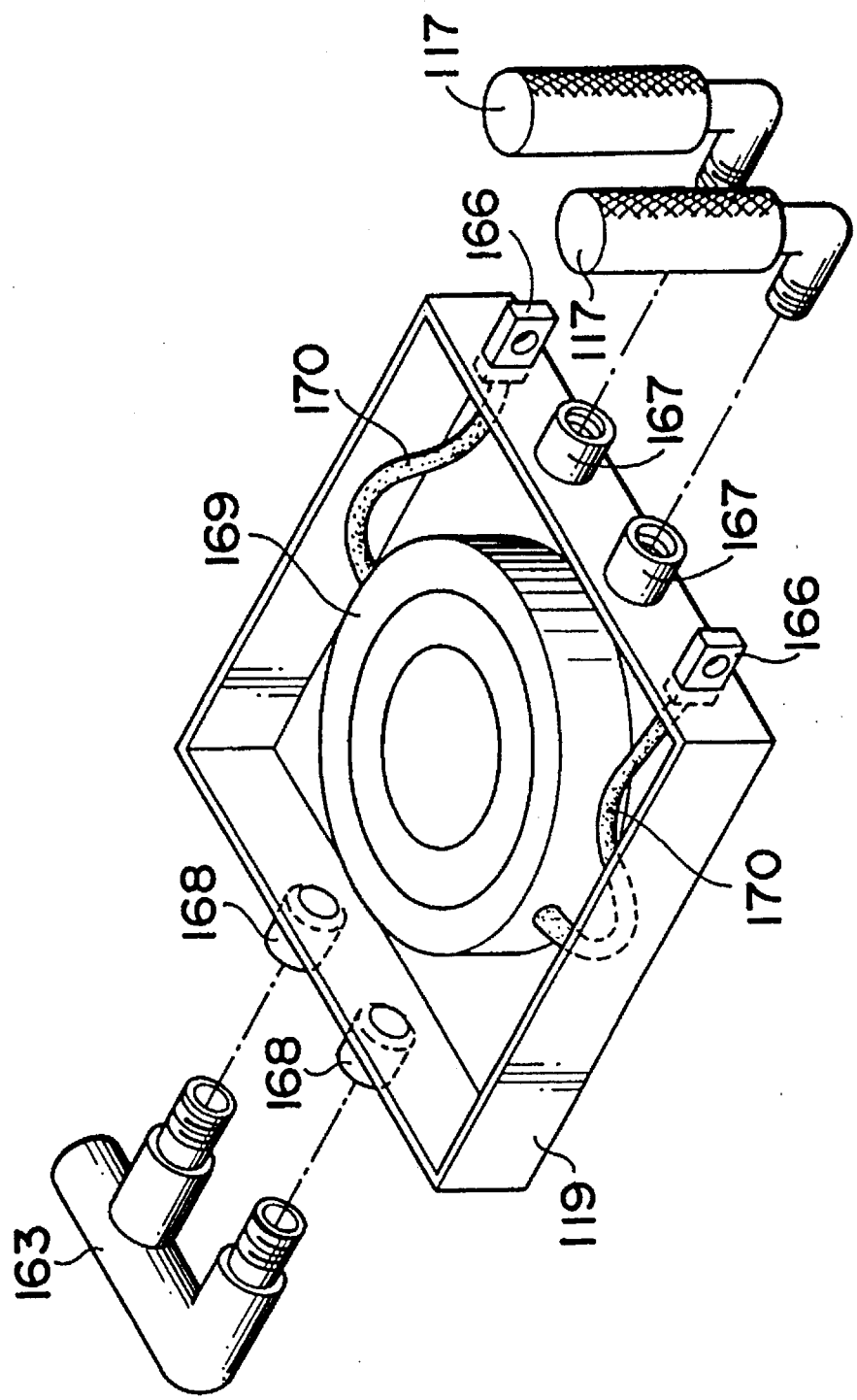
FIG. 16 is an exploded perspective view of the heater unit of FIG. 15 with the cover removed.

FIG. 16 shows a cover of the heater unit 119 removed to expose the internal structure thereof. An outer housing of the heater unit 119 is box-shaped and formed of a material such as aluminum, etc., which is not affected by electromagnetic wave. The high-frequency coil 169 is fixed to the central portion of the housing of the heater unit 119 for generating electromagnetic wave. There is provided a gap around the high-frequency coil 169 for permitting the air to flow therearound. The air can flow from the joint pipes 167 to the joint pipes 168. Power lines 170 connect between the high-frequency coil 169 and the electrodes 166 for supplying a large amount of electric power to the high-frequency coil 169.

Figure 17:
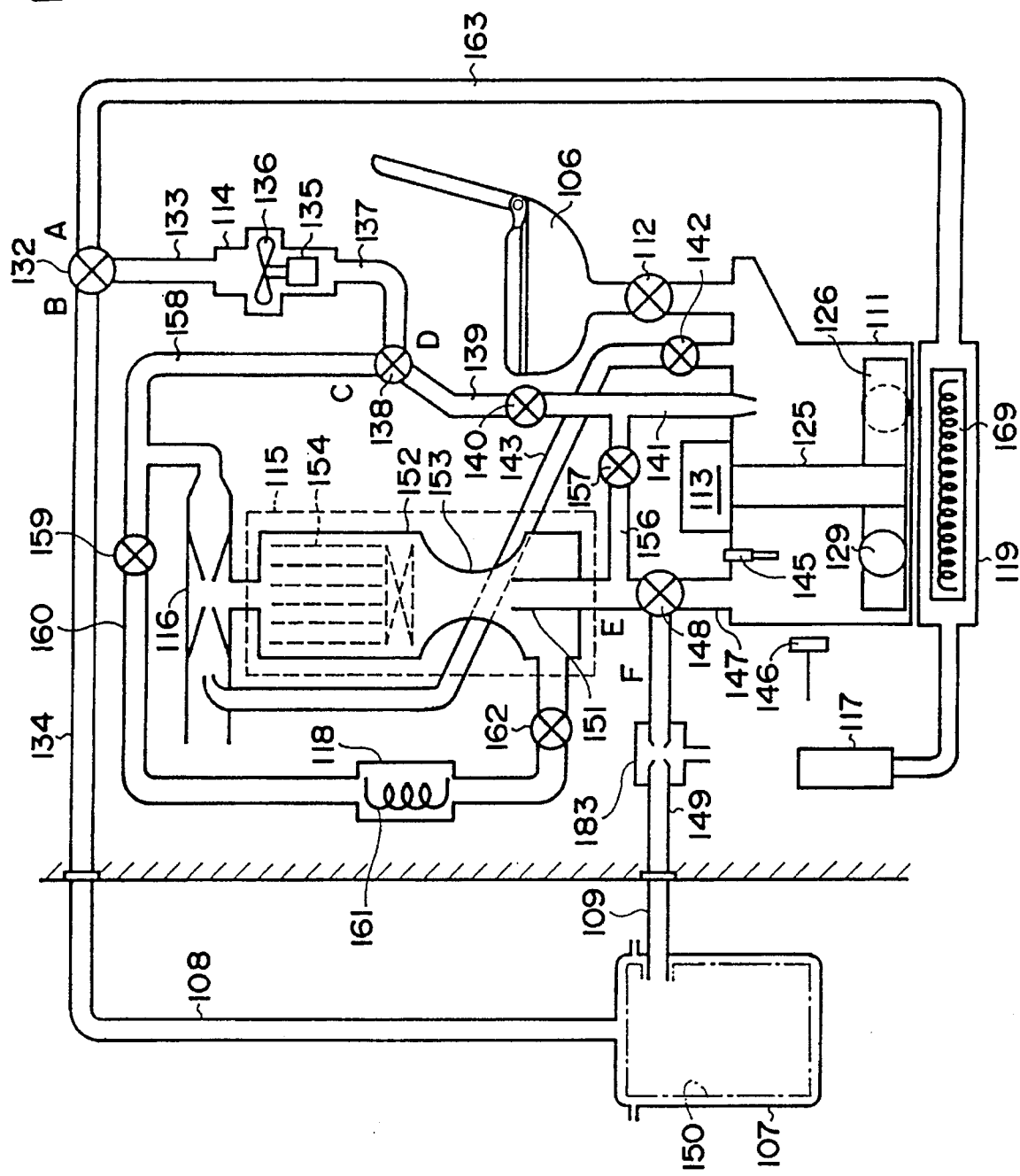
FIG. 17 is a schematic view showing the piping connection of various components of the apparatus of FIG. 11.

FIG. 17 shows the connections between various components disposed inside the raw sewage disposal apparatus 105. FIG. 17 also shows a piping connection of the air flow route and the flow route of the raw sewage.

The valve mechanism 112 is connected to the lower opening of the stool 106 for opening and closing the route between the stool 106 and the drying cauldron 111. The driving mechanism 113 is placed on the upper surface of the drying cauldron 111 and the rotary shaft 125 is rotatably inserted inside the drying cauldron 111. The stirring blades 126 fixed to the lower end of the rotary shaft 125 are positioned adjacent to the bottom portion of the drying cauldron 111. The multitude of ceramic heat-holding balls 129 are contained inside the drying cauldron 111. The heater 119 is positioned exteriorly of but closely adjacent the bottom surface of the drying cauldron 111. An overflow sensor 145 is fixed to the upper portion of the inside of the drying cauldron 111 for detecting the level of the liquid surface of the raw sewage contained in the drying cauldron 111, and temperature sensor 146 is fixed to the outer surface of the drying cauldron 111 for detecting the variation in the temperature on the surface of the drying cauldron 111.

The air cleaners 117 contain therein a paper or cloth having small mesh for removing the dust from the air. The air cleaners 117 communicate with the heater unit 119, and the discharge side of the heater unit 119 is connected to the air supply pipe 163. There is provided a selector valve 132 which can be switched to A and B directions or sides. The selector valve 132 is connected at the A side thereof to the terminal end of the air supply pipe 163, at the B side thereof to the suction pipe 134 and at the common side thereof to the suction pipe 133. A suction side of the air blower 114 is connected to the suction pipe 133. A motor 135 and a fan 136 which is driven by the motor 135 are contained in the air blower 114. An air supply pipe 137 is connected to the discharge side of the air blower 114. When the fan 136 is rotated, the air is transferred from the suction pipe 133 to the air supply pipe 137. There is provided a selector valve 138 which can be switched to C and D directions or sides. The terminal end of the air supply pipe 137 is connected to the common side of the selector valve 138. An air pressure supply pipe 158 is connected to the C side of the selector valve 138 and an air supply pipe 139 is connected to the D side of the selector valve 138. A closing valve 140 for opening and closing the air flow route is connected to the air supply pipe 139 and is also connected an ejection pipe 141. The ejection pipe 141 is connected to the upper portion of the drying cauldron 111 and has a nozzle at the tip end thereof which is directed into the drying cauldron 111.

An evaporation pipe 147 is connected to the upper opening of the drying cauldron 111 for discharging the vapor evaporated in the drying cauldron 111. There is provided a selector valve 148 which can be switched to E and F directions or sides. The evaporation pipe 147 is connected to the common side of the selector valve 148. A discharge pipe 151 is connected to the E side of the selector valve 148. A dust pipe 149 is connected to the F side of the selector valve 148. An airtight catalyst box 152 is accommodated inside the deodorizing box 115 and the tip end of the discharge pipe 151 extends to and is inserted into the catalyst box 152. The catalyst box 152 is surrounded by a heat insulating member and is accommodated inside the deodorizing box 115. The catalyst box 152 has a throttled portion 153 at the center thereof for narrowing the air flow route. The tip end of the discharge pipe 151 is positioned at the portion close to the throttled portion 153 and is disposed so as to draw the fresh air from the tip end of the discharge pipe 151 when the air flowing in the catalyst box 152 generates an ejector effect. A catalyst 154 formed of precious metals such as platinum, etc., are filled in the catalyst box 152 and is positioned downstream relative to the throttled portion 153.

A suction side of the T-shaped ejector 116 is connected to the discharge side of the deodorizing box 115 and the air inlet side of the ejector 116 is connected to the branched air pressure supply pipe 158. A bypass pipe 143 is connected to the discharge side of the ejector 116 and has an open end which is directed upstream relative to the air flow, and has the other end which communicates with the drying cauldron 111 through the closing valve 142. The air pressure supply pipe 158 is connected to the closing valve 159 which is connected to a preheating pipe 160. The preheating pipe 160 is connected to the hot-air blower 118 which accommodates therein a catalyst heater 161. The discharge side of the hot-air blower 118 is connected to the upstream side of the catalyst box 152 through the closing valve 162. The hot-air blower 118 is provided for heating the air supplied through the preheating pipe 160 to thereby preheat the catalyst 154. The hot-air blower 118 accommodates therein the catalyst heater 161 for generating heat when energized. A mixture pipe 156 is connected between the ejection pipe 141 and the discharge pipe 151 and contains the closing valve 157 therein.

A dust pipe 149 is connected to the F side of the selector valve 148 and a terminal end of the dust pipe 149 is connected to the discharge hose 109 outside the disposal apparatus 105. An air cooling unit 183 is connected to the dust pipe 149 for drawing the fresh air and for cooling the drawing air. A suction pipe 134 is connected to the B side of the selector valve 132 and has a terminal end connected to the suction hose 108 outside the disposal apparatus 105. The tip end of the suction hose 108 communicates with the inside of the dust collector 107. The dust collector 107 contains therein a dust bag 150 which is formed of a cloth having small mesh and is connected to the opening end of the discharge hose 109.

Figure 18:
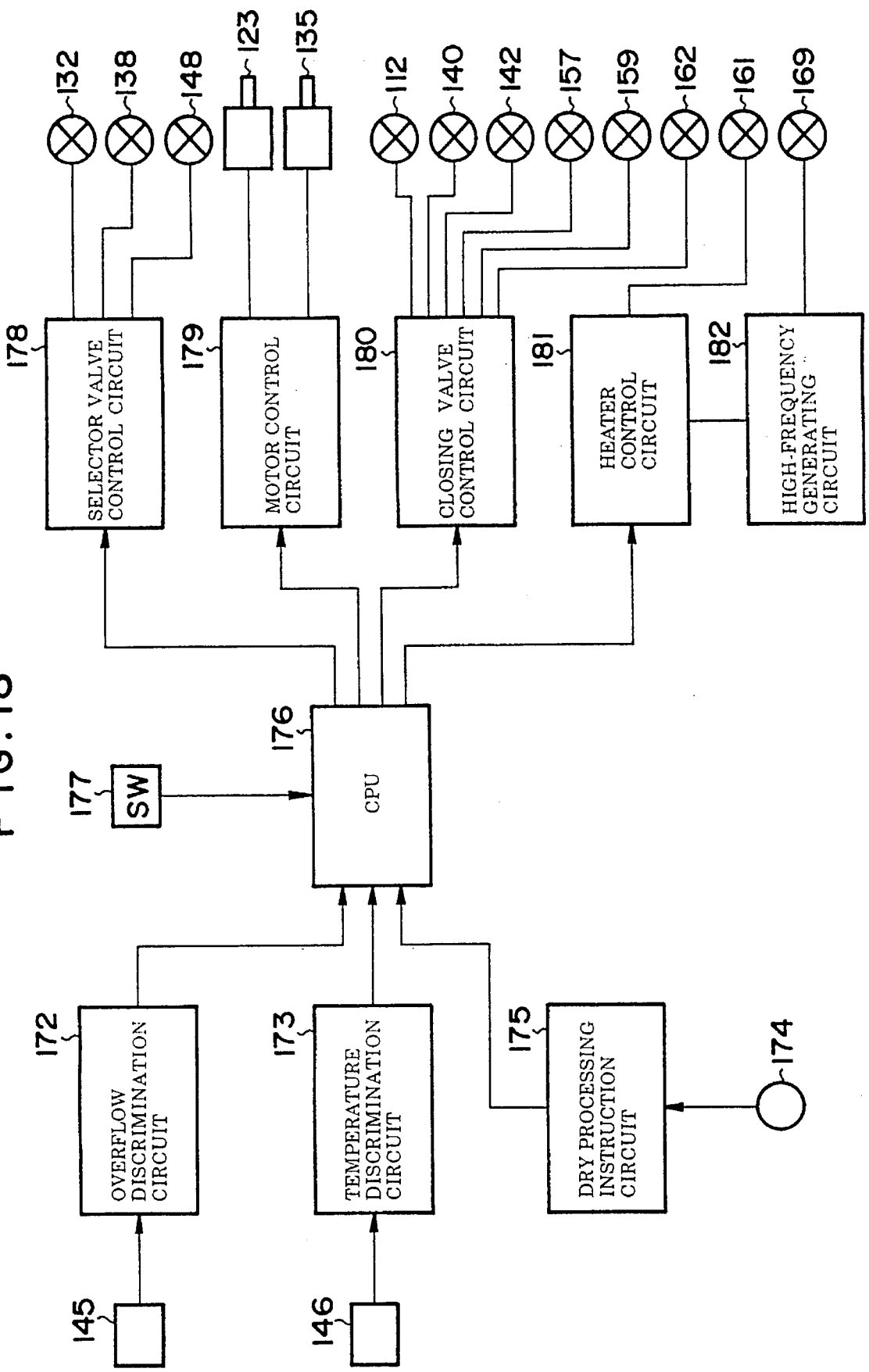
FIG. 18 is a block diagram of a control system for the apparatus of FIG. 11.
Figure 20:
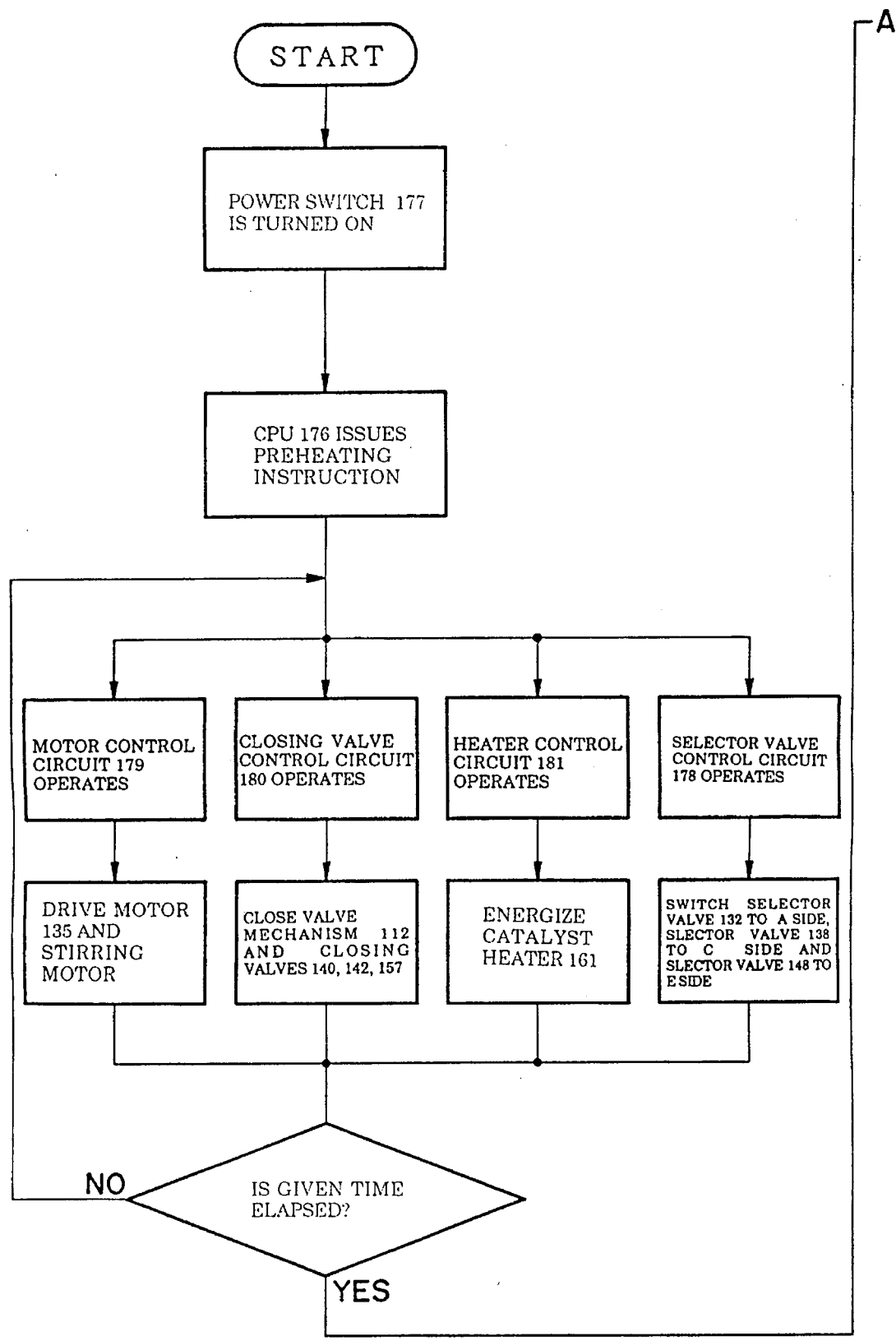
FIGS. 20 to 24 are flow charts showing the operations of the apparatus of FIG. 11.
Figure 21:
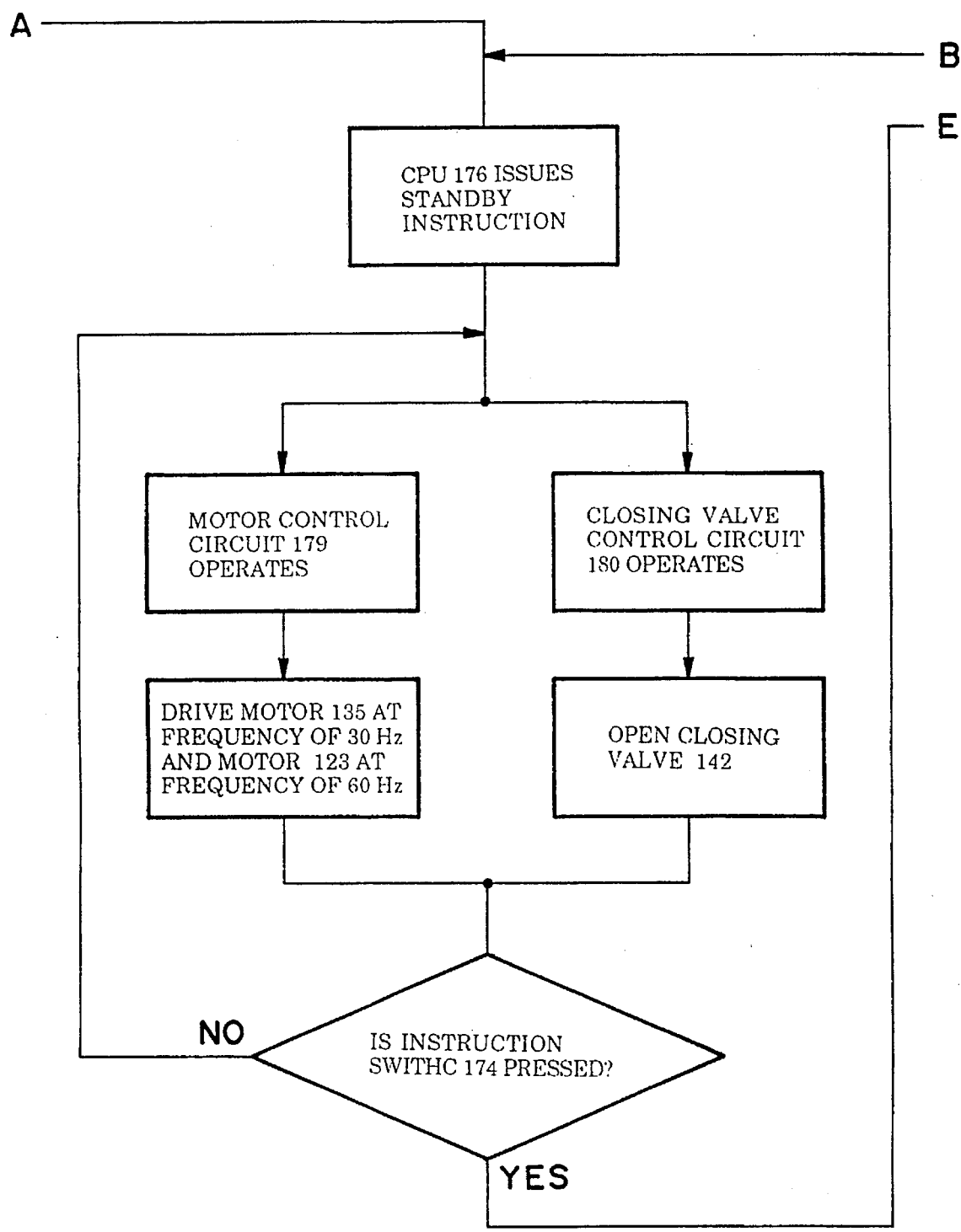
Figure 22:
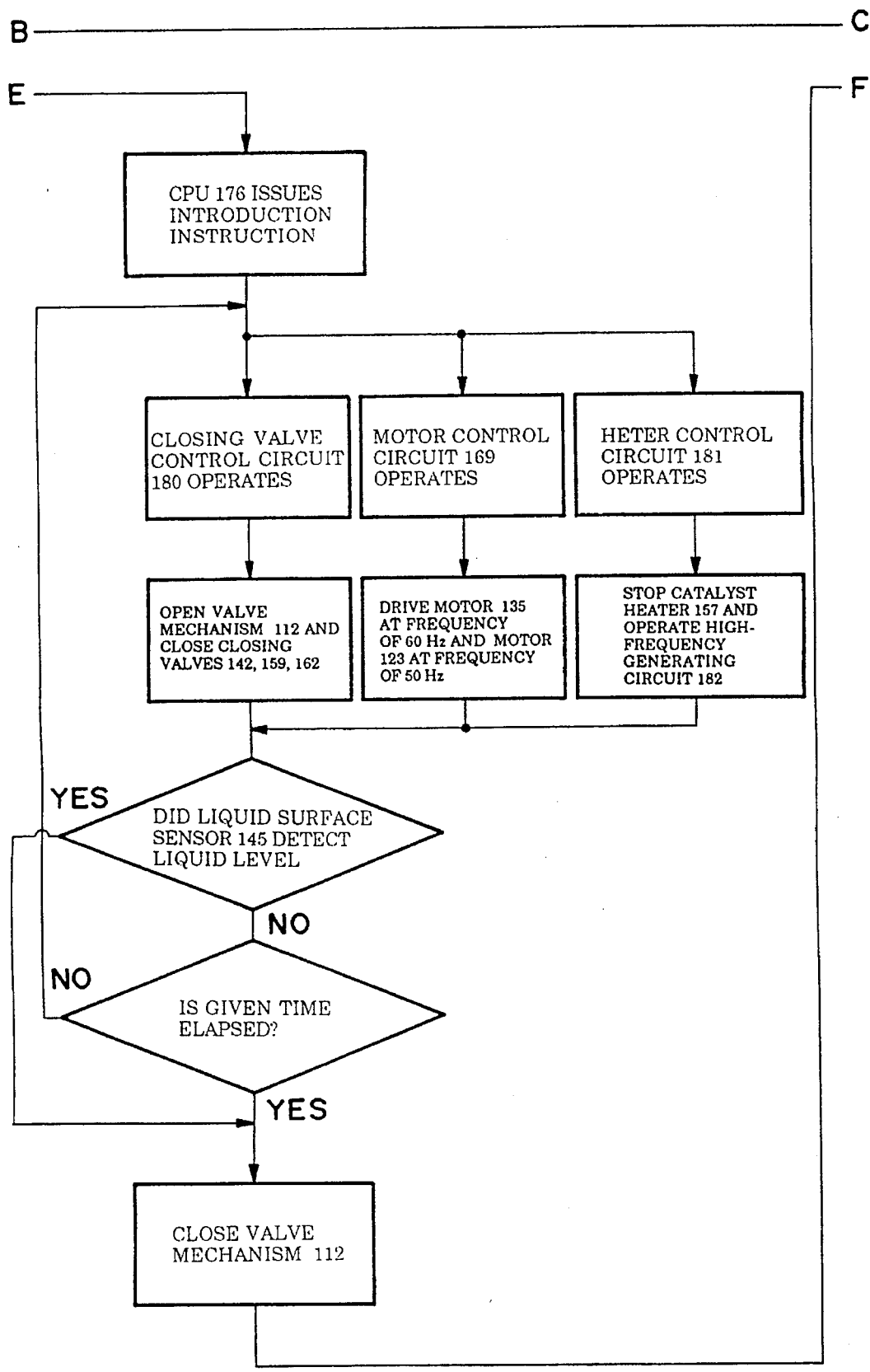
Figure 23:
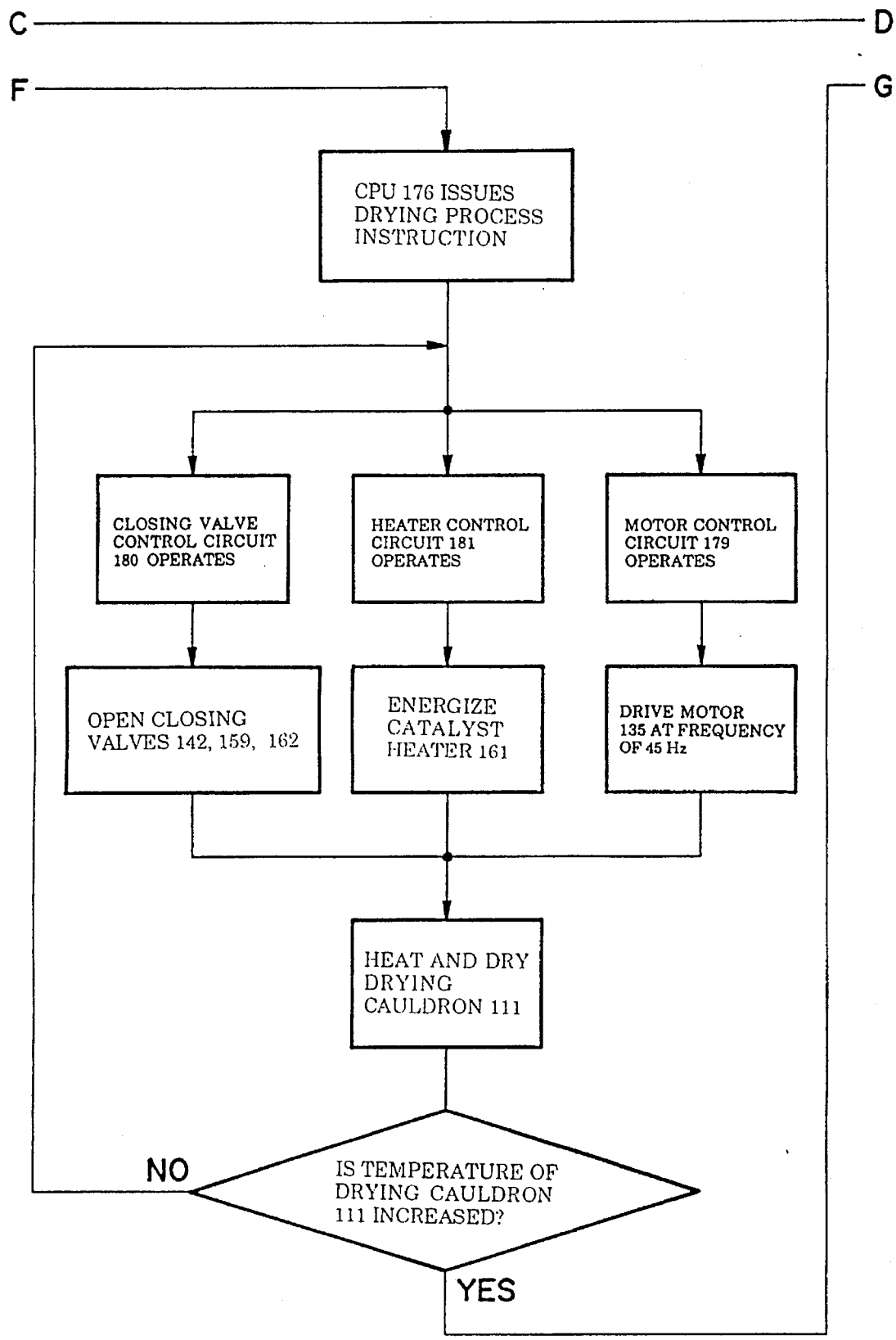
Figure 24:
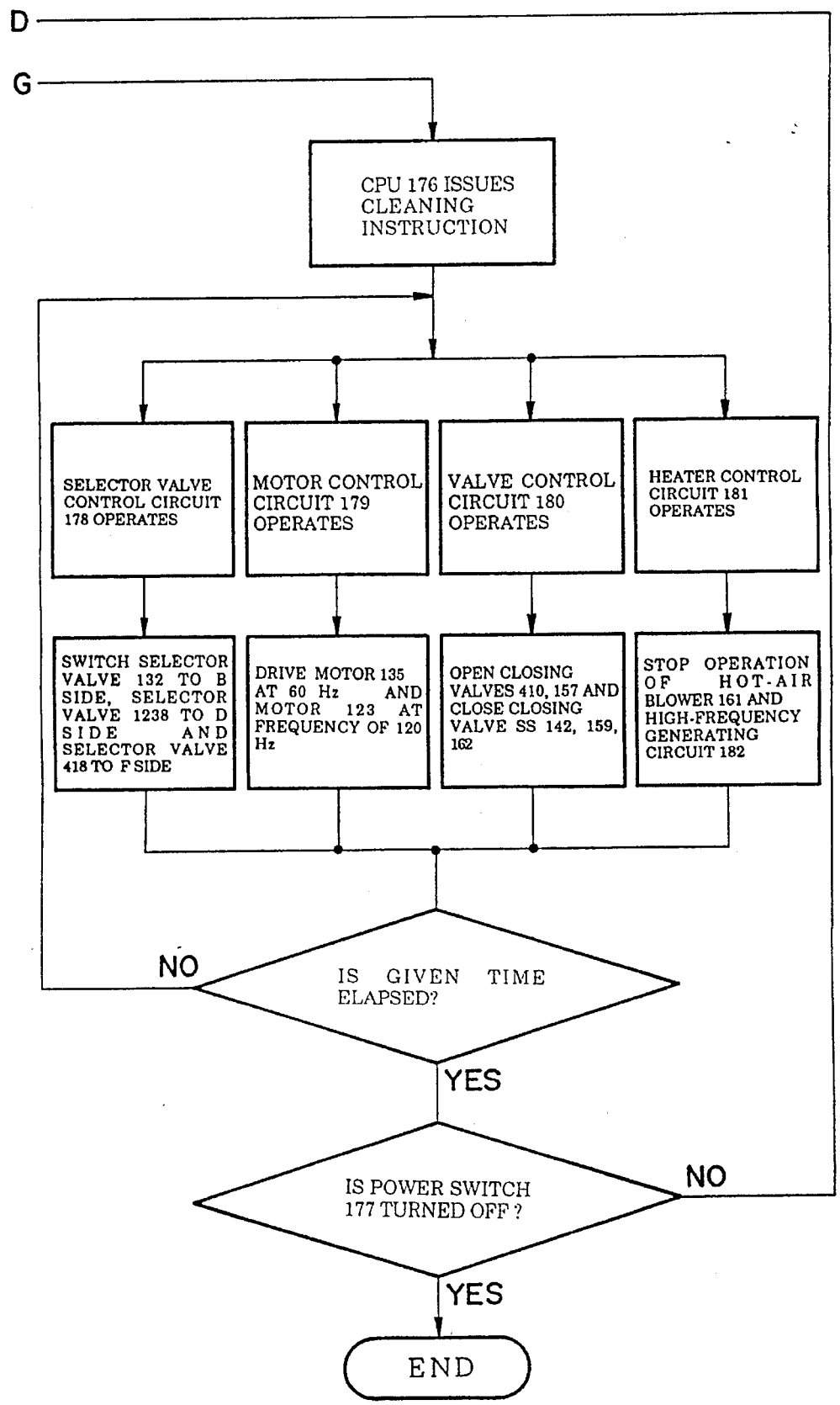

FIG. 18 is a block diagram of an electric control system for controlling the entire raw sewage disposal apparatus 105. In FIG. 18, an output of the overflow sensor 145 is connected to an overflow discrimination circuit 172. An output of a temperature sensor 146 is connected to a temperature discrimination circuit 173. An output of an instruction switch 174 representing the completion of the use of the temporary toilet 101 by the user is connected to a dry processing instruction circuit 175. Outputs of these circuits 172, 173 and 175 are connected to a CPU 176 (for example, a microcomputer, etc.) which is connected to a power switch 177 for starting all the operations of the apparatus 105.

Control outputs from the CPU 176 are connected to a selector valve control circuit 178, a motor control circuit 179, a closing valve control circuit 180 and a heater control circuit 181 which respectively independently control their functions when receiving the control signal from the CPU 176. Selector valves 132, 138 and 148 are connected to the output of the selective valve control circuit 178, the stirring motor 123 and the fan motor 135 are connected to the output of the motor control circuit 179, the valve mechanism 112 and the closing valves 140, 142, 157, 159 and 162 are connected to the output of the closing valve control circuit 180, and the catalyst heater 161 and the high-frequency generating circuit 182 are connected to the output of the heater control circuit 181. The high-frequency coil 169 is connected to the high-frequency generating circuit 182. The high-frequency generating circuit 182 comprises controls such as an invertor, etc. which can generate a power of high frequency which is higher than the commercial frequency so as to be capable of generating the magnetic inductance.

The operation of the raw sewage disposal apparatus 105 according to the second embodiment will now be described with reference to FIG. 19 which show a truth table and FIGS. 20 to 24 which show a flow chart.

Before starting a drying operation of the apparatus 105, the main portions of the disposal apparatus 105 must be preheated and kept in a standby condition so as to permit disposal of the raw sewage immediately after usage of the temporary toilet 101.

The power switch 177 is manually turned on to issue a starting signal to the CPU 176 representing the start of use of the apparatus 105. The CPU 176, upon reception of this signal, supplies a preheating signal to the selector valve control circuit 178, the motor control circuit 179, the closing valve control circuit 180 and the heater control circuit 181. The selector valve control circuit 178, upon reception of the preheating signal, switches the selector valve 132, the selector valve 138 and the selector valve 148 to thereby connect the selector valve 132 to the A side, the selector valve 138 to the C side and the selector valve 148 to the E side. At the same time, the closing valve control circuit 180 closes the valve mechanism 112 and the closing valves 140, 142 and 157 while it opens the closing valve 159 and 162. The motor control circuit 179 also supplies the preheating signal to the motor 135 and the stirring motor 123, thereby operating them so that the motor 135 is rotated at a low frequency (such as about 45 Hz) while the stirring motor 123 is rotated at normal frequency such as 50 Hz. The stirring motor 123, acting through the gear box 124, rotates the rotary shaft 125. And the heater control circuit 181 supplies power to the catalyst heater 161 so as to heat the heater 161 which in turn heats the air passing through the hot-air blower 118, whereby the catalyst 154 is warmed.

The aforementioned condition is referred to as a preheating operation, and the air flow route formed in the apparatus is as follows. The fan 136 is driven by the motor 135 so that air is forced to flow from the suction pipe 133 into the air supply pipe 137. As a result, the fresh air is drawn from the atmosphere by way of the air cleaners 117, the heater unit 119, the air supply pipe 163 and the selector valve 132. The fresh air drawn by the fan 136 flows to the ejector 116 by way of the air supply pipe 137, the selector valve 138 and the air pressure supply pipe 158. A part of the air flowing in the air pressure supply pipe 158 is supplied into the catalyst box 152 upstream relative to the catalyst 154 by way of the closing valve 159, the preheating pipe 160, hot-air blower 118 and the closing valve 162. When the air flows at high speed in the ejector 116, negative pressure is generated in the central portion of the ejector 116 for sucking or drawing the air from the catalyst box 152 so that the air supplied from the hot-air blower 118 is drawn into the upstream end of the catalyst box 152. In this way, the air supplied from the air blower 114 is moved, in order, through the air supply pipe 137, the selector valve 138, the air pressure supply pipe 158, the closing valve 159, the preheating pipe 160, the hot-air blower 118, the closing valve 162, the catalyst box 152, and the ejector 116, and then is discharged outside from the ejector 116.

In the flow of the air, since the catalyst heater 161 is provided in the hot-air blower 118, the air passing through the blower 118 contacts the heater 161 and is heated, and then flows into the catalyst box 152 where the heated air warms the catalyst 154 until it reaches a predetermined temperature. This maintains the catalyst 154 at least at a given temperature so as to perform the oxidation-reduction function. The raw sewage disposal apparatus 105 is, after this preheating operation, ready for its next operation.

When the air blower 114 is operated to permit fresh air to flow and the preheating operation is performed for a given time, that is, the catalyst 154 is warmed by the hot-air blower 118 for about 25 minutes, the raw sewage disposal apparatus 105 is changed into a standby condition. The standby condition means that the catalyst 154 is warmed by the preheating operation so that the temporary toilet 101 is ready to be used by a user.

If a given time elapses after the power switch 177 is turned on, the CPU 176 supplies a control signal to the motor control circuit 179 and the closing valve control circuit 180 so that they are under a standby condition. The motor control circuit 179 lowers the power to be supplied to the motor 135 to about 30 Hz so as to reduce the amount of air supplied by the air blower 114. At the same time, the motor control circuit 179 increases the power supplied to the stirring motor 123 to about 60 Hz to thereby increase the rotating speed. The closing valve control circuit 180 opens the closing valve 142 so that the air from the ejector 116 is supplied into the drying cauldron 111 through the bypass pipe 143. The air supplied through the bypass pipe 143 passes through the evaporation pipe 147, the selector valve 148 and the discharge pipe 151 and then enters the catalyst box 152. With this air flow, the drying cauldron 111 is always dried.

When the raw sewage disposal apparatus 105 maintains the standby operation due to the preheating condition, the temporary toilet 101 can be used by the user. It is possible to indicate the possibility of use of the temporary toilet 101 to the user, by means of, for example, an indication lamp representing the condition of the raw sewage disposal apparatus 105. When using the temporary toilet 101, the user opens the door 104 and enters the house 103 and discharges raw sewage into the stool 106. The discharged raw sewage is temporarily stored in the stool 106 above the closed valve mechanism 112. The user presses the instruction switch 174 representing the completion of use of the toilet so as to introduce the discharged raw sewage into the drying cauldron 111, whereby a series of evaporation and drying operations can start.

When the instruction switch 174 is pressed by the user, an instruction signal is issued which is supplied to the CPU 176 by way of the dry processing instruction circuit 175. The CPU judges by itself that the raw sewage must be introduced into the drying cauldron 111 and sends an introduction instruction to the motor control circuit 179, the closing valve control circuit 180 and the heater control circuit 181. First, the motor control circuit 179 supplies the high-frequency power of 60 Hz to the motor 135 to thereby increase the amount of air to be supplied from the air blower 114 and also supplies the frequency of 50 Hz to the stirring motor 123 so as to slightly reduce the rotating speed of the rotary shaft 125. The closing valve control circuit 180 opens the valve mechanism 112 and closes the closing valves 142, 159 and 162 so as to stop the supply of air into the drying cauldron 111. At the same time, the heater control circuit 181 stops the supply of power to the catalyst heater 161 so as to stop the heating and at the same time operates the high-frequency generating circuit 182 so that high-frequency power is supplied to the coil 169.

When the valve mechanism 112 is opened by the circuit 180, the raw sewage stored in the bottom of the stool 106 passes into the introduction portion 127 and then flows into the cauldron 111. After the circuit 180 opens the valve mechanism 112 for a given time (i.e. several seconds to several ten seconds), it closes the valve mechanism 112 so as to interrupt the communication between the stool 106 and the cauldron 111. This prevents the bad smell of the raw sewage from being diffused outside.

The motor control circuit 179 now supplies power having a high frequency of about 60 Hz to the motor 35. Accordingly, the amount of fresh air which is drawn by the air blower 114 is increased and the thus increased fresh air is permitted to flow toward the ejector 116 by way of the air supply pipe 137, the selector valve 138 and the air pressure supply pipe 158. As set forth above, since the closing valve control circuit 180 closes the closing valves 142, 159 and 162, negative pressure generated in the ejector 116 strongly draws the air in the catalyst box 152 so that the air in the drying cauldron 111 is strongly drawn by way of the evaporation pipe 147, the selector valve 148, the discharge pipe 151 and is then diffused outside. When the valve mechanism 112 is temporarily opened, if the inside of the drying cauldron 111 is at normal pressure, the drying cauldron 111 communicates with the atmosphere by way of the bottom of the stool 106 and the bad smell in the drying cauldron 111 is diffused outside. Accordingly, in order to prevent the bad smell of the raw sewage in the drying cauldron 111 from leaking outside, the drying cauldron 111 must be negatively pressurized. The air which is drawn in the catalyst box 152 by the ejector 116 passes through the throttled portion 153 and then contacts the catalyst 154 which has already been warmed by the hot-air blower 118. The air is subjected to oxidation-reduction upon contacting the catalyst 154 and becomes odorless, and is then diffused into the atmosphere by the ejector 116.

If the amount of raw sewage in the drying cauldron 111 exceeds an allowable amount, the level of the liquid surface of the raw sewage is detected by the overflow sensor 145. The overflow sensor 145 issues a signal representing that the amount of raw sewage in the drying cauldron 111 exceeds the allowable amount, which signal is supplied to the overflow discrimination circuit 172. The overflow discrimination circuit 172 also issues the same signal as the one supplied by the overflow sensor 145, which signal is supplied to the CPU 176. The CPU 176, upon reception of this signal, discriminates that the raw sewage exceeding the allowable amount is introduced into the drying cauldron 111 and issues an emergency signal which is supplied to the closing valve control circuit 180. As a result, the valve mechanism 112 is closed so that raw sewage exceeding the allowable amount is prevented from further being introduced into the drying cauldron 111. The stool 106 is stopped from being used during the time when the valve mechanism 112 stops the introduction of raw sewage in the drying cauldron 111 until the drying operation of the raw sewage is completed.

The circuit 181 stops the supply of power to the heater 161 for preventing the heater 161 from being broken due to high temperature caused by the stoppage of air flow because of the closing of the valves 159 and 162. Since high-frequency power is supplied from the circuit 182 to the coil 169 based on the instruction from the circuit 181, the coil 169 permits the high-frequency electromagnetic wave to be transmitted to the bottom of the cauldron 111 (which is made of metal such as iron), whereby induction heating occurs whereby the cauldron 111 per se generates heat. The induction heating operation continues from the raw sewage introduction operation until the next drying operation.

When the valve mechanism 112 is opened by the CPU 176 for a given time (several to several ten seconds) and the raw sewage is stored in the drying cauldron 111, the drying operation by the evaporation of the raw sewage is successively performed. The CPU judges by itself that the drying operation must be started and supplies the control signal representing the start of the drying operation to the motor control circuit 179, the closing valve control circuit 180 and the heater control circuit 181. First, the motor control circuit 179 lowers the frequency of the power to be supplied to the motor 135 to 45 Hz to thereby reduce the rotating speed of the fan 136 so that the amount of air supplied for the air blower 114 is made the same as during the preheating operation. The motor control circuit 179 maintains the supply of power having a frequency of 50 Hz to the stirring motor 123. The closing valve control circuit 180 closes the valve mechanism 112 and maintains open the closing valves 142, 159 and 162. At the same time, the heater control circuit 181 supplies power to the catalyst heater 161 so as to generate heat while the high-frequency power generated by the high-frequency generating circuit 182 is supplied to the high-frequency coil 169.

Since the motor control circuit 179 continues to operate the stirring motor 123 at frequency of 50 Hz as set forth above, the rotating force of the stirring motor 123 is reduced by the gear box 124 and the thus reduced rotating force rotates the rotary shaft 125. Accordingly, the stirring blades 126 are rotated adjacent the bottom of the drying cauldron 111 so as to stir the introduced raw sewage and the heat-holding balls 129. At this time, the raw sewage is mixed and is warmed uniformly as a whole. At the same time, it is also heated by the heat accumulated in the heat-holding balls 129 which is transmitted from the surfaces thereof to the surrounding raw sewage to thereby expedite the heating of the raw sewage. Since the heat-holding balls 129 have spherical large surface areas, the heat transmission to the raw sewage is large so that the drying speed of the raw sewage is expedited. (If the heat-holding balls 129 are formed of metal, the heat-holding balls 129 per se generate heat by the electromagnetic wave from the high-frequency coil 169.) As a result, the liquid component of the raw sewage is gradually changed into vapor and is evaporated.

When the high-frequency power is supplied to the coil 169, the coil 169 per se generates heat due to overcurrent loss. The coil 169 is housed in the heater unit 119. The fresh air passes through the heater unit 119 from the air cleaner 117 during the operation of the air blower 114 and this air cools the coil 169 and the air itself is warmed by this heat exchange. The warmed air flows in the drying cauldron 111 and the catalyst 154, and hence the waste heat is effectively utilized.

When the motor 135 is driven by the motor control circuit 179, the fan 136 is driven so that the fresh air is drawn into the air blower 114 through the air cleaner 117, the heater unit 119, air supply pipe 163, the selector valve 132 and the suction pipe 133. Since the valves 142, 159 and 162 are opened by the valve control circuit 180, the drawn air is transmitted toward the ejector 116 by way of the air supply pipe 137, the selector valve 138 an the air pressure supply pipe 158. The air is drawn through the catalyst box 152 by the negative pressure generated by the ejector 116. At the same time, a part of the air from the air pressure supply pipe 158 enters the hot-air blower 118 through the valve 159 and the preheating pipe 160. The temperature of this air is increased by the heater 161 and is supplied to the catalyst box 152 upstream thereof through the valve 162. When the air circulation route is formed by the closing valve 159, preheating pipe 160, hot-air blower 118, closing valve 162 and catalyst box 152, the air which is warmed by the catalyst heater 161 warms the catalyst 154 and maintains the temperature thereof so as to subject the bad smell component to oxidation-reduction. This is the same as the preheating standby condition.

The air discharged from the ejector 116 flows into the opening of the bypass pipe 143 and passes therethrough and thereafter is discharged from the closing valve 142 toward the drying cauldron 111. Accordingly, since the fresh air is always supplied to the inside of the drying cauldron 111 through the bypass pipe 143 at the time of the drying operation, the raw sewage in the drying cauldron 111 is oxidized by the oxygen in the fresh air. At the same time, the fresh air from the bypass pipe 143 also keeps the drying cauldron 111 under normal pressure and operates to flow out the evaporated vapor from the drying cauldron 111. Since the tip end of the discharge pipe 151 communicating with the evaporation pipe 147 and the selector valve 148 is close to the throttled portion 153 of the catalyst box 152, the vapor from the raw sewage in the drying cauldron 111 is drawn toward the catalyst box 152 by the ejector effect in the throttled portion 153. In such a manner, the evaporated liquid component of the raw sewage is successively changed into the vapor. This vapor flows from the evaporation pipe 147 and passes through the catalyst 154 and is drawn by the ejector 116 and is finally diffused outside. When the vapor, etc., evaporated in the drying cauldron 111 passes through the catalyst 154, the base smell component such as urea, ammonia which is included in the vapor and the air contacts the catalyst 154 and is subjected to oxidation-reduction and is changed into an odorless component which is diffused outside.

When the air flow and the heating of the drying cauldron 111 by the high-frequency coil 169 continue, all of the liquid component is finally evaporated, and hence the drying operation of the raw sewage in the drying cauldron 111 is completed. When the liquid component of the raw sewage in the drying cauldron 111 is all evaporated, the boiling temperature cannot be maintained so that the temperature of the outer wall of the drying cauldron 111 is increased. The change of this temperature is detected by the temperature sensor 146 which issues a detection signal. This detection signal is supplied to the temperature discrimination circuit 173. The temperature discrimination circuit 173 judges that all the liquid component in the drying cauldron 111 is evaporated when the temperature of the outer wall of the drying cauldron 111 is sharply increased above the boiling point, and it issues a discrimination signal. The discrimination signal is supplied to the CPU 176. The CPU 176, upon reception of the discrimination signal, stops the drying operation and instructs the other components to move to the cleaning operation.

When the liquid component of the raw sewage in the drying cauldron 111 is evaporated due to both the heating of the drying cauldron 111 by the electromagnetic wave generated in the high-frequency coil 169 and the stirring operation of the raw sewage by the stirring blades 126 and the heat-holding balls 129, the component such a fibrous substance, etc., which is not evaporated in the raw sewage remains in the drying cauldron 111 as residual substances. Accordingly, it is necessary to perform a cleaning operation for removing the residual substances and dust remaining in the drying cauldron 111 every time the drying operation is completed. The cleaning operation is automatically started when the sharp increase of the temperature of the drying cauldron 111 is discriminated by the temperature sensor 146.

The temperature discrimination circuit 173 discriminates, based on the change of the temperature of the surface of the drying cauldron 111, the completion of the drying operation and issues a discrimination signal to the CPU 176. The CPU 176 then supplies a control signal to each of circuits 178, 179, 180 and 181 instructing to move to the cleaning operation. Upon reception of the control signal, the selector valve control circuit 178 switches the selector valve 132 to the B side, the selector valve 138 to the D side and the selector valve 148 to the F side. The motor control circuit 179 continues to operate the motor 135 and the stirring motor 123, but it supplies a high-frequency power, i.e. 60 Hz to the motor 135 to thereby increase the rotating speed of the fan 136 and supplies high-frequency power, i.e. 120 Hz to the stirring motor 123 to thereby rotate the rotary shaft 125 at high speed. The closing valve control circuit 180 closes the closing valves 142, 159 and 162 and opens the closing valves 140 and 157. The heater control circuit 181 stops the supply of power to the catalyst heater 161 and stops the operation of the high-frequency generating circuit 182 so as to stop the heating of the drying cauldron 111 by the high-frequency coil 169.

With such operations of the selector valves and the closing valves, there is formed an air circulation route which is different from the aforementioned air circulation route. That is, the air supplied from the air blower 114 is supplied to the drying cauldron 111 by way of the air supply pipe 137, the selector valve 138, the air supply pipe 139, the closing valve 140 and the ejection pipe 141. The air from the drying cauldron 111 returns to the air blower 114 by way of the evaporation pipe 147, the selector valve 148, the air cooling unit 183, the dust pipe 149, the discharge hose 109, the dust collector 107, the suction hose 108, the suction pipe 134, the selector valve 132 and the suction pipe 133. Since the fan 136 in the air blower 114 is rotated at high speed by the motor 35, a large amount of air as supplied from the air blower 114 passes through this closed circulation route at high speed. The jetted air from the nozzle of the ejection pipe 141 blows up the residual substances and dust remaining in the drying cauldron 111. The blown up residual substances and dust are forced to pass together with the air through the evaporation pipe 147, the selector valve 148, the air cooling unit 183, the dust pipe 149 and the discharge hose 109 into the dust bag 150. The residuals substances and dust are caught by the dust bag 150 which is formed of cloth or paper of fine mesh. However, the air from which the residual substances and dust is removed is returned to the air blower 114 through the suction hose 108.

When the air from the drying cauldron 111 passes through the air cooling unit 183, surrounding cool air is mixed with the warm air from the drying cauldron 111 to cool the temperature of the air and residual substances prior to their being supplied to the bag 150. When the surrounding air enters the circulation air route at cooling unit 183, the pressure of the air flowing in the circulation air route is increased. However, since the closing valve 157 is opened, a part of the pressurized air from the air blower 114 passes through the mixture pipe 156 and enters the discharge pipe 151, then passes through the catalyst box 152 and is finally discharged outside from the ejector 116. In such a manner, the pressure of the air which is drawn by the air cooling unit 183 for cooling purpose is escaped outside.

When the air is permitted to flow in the closed circulation air route at high speed, the residual substances and dust remaining in the drying cauldron 111 are moved into the dust collector 107 and caught by the dust bag 150, whereby the cleaning operation can be performed automatically without resorting to manual labor. The stirring motor 123 continues to operate during the time when the residual substances and dust in the drying cauldron 111 are blown up by the air flowing at high speed. As a result, the rotary shaft 125 and stirring blades 126 rotate the heat-holding balls 129 adjacent the bottom of the drying cauldron 111, whereby the residual substances stuck to the inner wall of the drying cauldron 111 are changed into fine particles by the rotation of the balls 129 and the thus fine particles and dust are easily blown up by the air flow.

In such a manner, the residual substances and dust on the drying cauldron 111 are blown up due to the high speed circulation of the air and due to closed air circulation, and the residual substances and dust are removed from the air in the dust collector 107. Accordingly, the cleaning operation of the drying cauldron 111 is automatically performed. If this cleaning operation is performed continuously for about several ten seconds, the CPU 176 judges by itself the completion of the cleaning operation and supplies signals to the selector valve control circuit 178, the motor control circuit 179, the closing valve control circuit 180 and the heater control circuit 181 so as to cause each component of the raw sewage disposal apparatus 105 to go into a standby condition. First, the selector valve control circuit 178 switches the selector valve 132 to the A side, the selector valve 138 to the C side and the selector valve 148 to the E side; the motor control circuit 179 rotates the motor 135 at the lower frequency of 30 Hz and rotates the stirring motor 123 at a high frequency of 60 Hz; the closing valve control circuit 180 opens the closing valves 142, 159 and 172 and closes the closing valves 140 and 157; and the heater control circuit 181 supplies power to the catalyst heater 161 so that the catalyst heater 161 generates heat. The disposal apparatus 105 is thus returned to the same condition as the standby condition. As a result, the temporary toilet 101 is returned to the standby condition awaiting use by the next user.

In such a manner, the raw sewage disposal apparatus 105 automatically repeats the cycles of preheating standby, raw sewage introduction, drying, and cleaning operations. As a result, even though the raw sewage is subjected to drying and evaporating operations in the airtight drying cauldron 111, the residual substances and dust do not remain in the drying cauldron 111, which ensures an extended use of the disposal apparatus 105.

As mentioned above, each component of the raw sewage disposal apparatus 105 performs an automatic operation upon reception of instructions from the CPU 176 in a given cycle to thereby dispose of the raw sewage. In the event it is necessary to move the temporary toilet 101 or to stop the operation thereof for inspection, the power switch 177 is manually operated to thereby issue an operation stop signal to the CPU 176. The CPU 176 supplies, upon reception of this signal, an operation stop control signal to all circuits 178, 179, 180 and 181, thereby stopping all the operation of these circuits. When all circuits are stopped, the motor 135 and stirring motor 123 stop, no power is supplied to the catalyst heater 161, and the high-frequency generating circuit 182 does not supply power to the high-frequency coil 169.

Thus, the temporary toilet can be operated hygienically and very simply. Furthermore, the container containing the raw sewage is neither directly heated by the heater nor heated by a burner which combusts fuel, but the container per se is heated by induction heating of an electromagnetic wave generated by a high-frequency electric coil. As a result, thermal efficiency for converting the supplied energy into heat is increased, and there is little fire hazard.

According to the present invention, the stirring of the raw sewage contained in the raw sewage disposal apparatus controls the temperature and generates vibration. However, according to this second embodiment of the invention, since the raw sewage disposal apparatus is heated by induction heating with a gap being defined between the disposal apparatus and the high-frequency coil, the vibration generated in the disposal apparatus is not transmitted to the high-frequency coil. As a result, the likelihood of breakage is minimized, and the heater can be maintained easily for a long period of use.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A raw sewage disposal apparatus comprising:

a heat-resistant airtight container for containing raw sewage therein;

induction heating means disposed under and close to said container, said heating means having therein a high-frequency coil for generating a high-frequency electromagnetic wave so that said container is heated by induction heating from the electromagnetic wave generated by said induction heating means, said induction heating means comprising a box which is hollow at the inside thereof and said high-frequency coil is housed in and fixed to said box, said box having a space through which air flows;

a high-frequency generating circuit for supplying high-frequency power to said induction heating means;

stirring means disposed in said container, said stirring means having a plurality of stirring blades for stirring the raw sewage; and a multitude of heat-holding balls contained in said container.

2. The raw sewage disposal apparatus according to claim 1, further comprising:

a stool to which raw sewage is discharged; and a valve mechanism disposed between said stool and said container for permitting said stool to communicate with said container.

3. A raw sewage disposal apparatus according to claim 1, wherein fresh air is permitted to flow inside said box surrounding said induction heating means, and the air which cools said high-frequency coil is permitted to flow inside said container.

4. A raw sewage disposal apparatus comprising:

a heat-resistant airtight container for containing raw sewage therein;

induction heating means disposed under and close to said container, said heating means having therein a high-frequency coil for generating a high-frequency electromagnetic wave so that said container is heated by induction heating from the electromagnetic wave generated by said induction heating means, said induction heating means being box-shaped, and said induction heating means being detachably slidably mounted along a guide rail disposed under the container;

a high-frequency generating circuit for supplying high-frequency power to said induction heating means;

stirring means disposed in said container, said stirring means having a plurality of stirring blades for stirring the raw sewage; and a multitude of heat-holding balls contained in said container.

5. The raw sewage disposal apparatus according to claim 4, further comprising:

a stool to which raw sewage is discharged; and a valve mechanism disposed between said stool and said container for permitting said stool to communicate with said container.

6. A raw sewage disposal apparatus comprising:

a heat-resistant airtight container for containing raw sewage therein;

induction heating means disposed under and close to said container, said heating means having therein a high-frequency coil for generating a high-frequency electromagnetic wave so that said container is heated by induction heating from the electromagnetic wave generated by said induction heating means;

a high-frequency generating circuit for supplying high-frequency power to said induction heating means;

stirring means disposed in said container, said stirring means having a plurality of stirring blades for stirring the raw sewage;

a multitude of heat-holding balls contained in said container; and a gap defined between a lower portion of said container and an upper portion of said induction heating means.

7. The raw sewage disposal apparatus according to claim 6, further comprising:

a stool to which raw sewage is discharged; and a valve mechanism disposed between said stool and said container for permitting said stool to communicate with said container.

* * * * *